United States Patent
Korshikov et al.

(10) Patent No.: US 11,230,615 B2
(45) Date of Patent: Jan. 25, 2022

(54) DUAL-MEDIATED POLYMERIZABLE COMPOSITE FOR ADDITIVE MANUFACTURING

(71) Applicant: Mighty Buildings, Inc., San Francisco, CA (US)

(72) Inventors: Vasily Korshikov, Tomsk (RU); Anna Trushina, Tomsk (RU); Dmitry Starodubtsev, Tomsk (RU); Slava Solonitsyn, Mountain View, CA (US); Igor Kovalev, Tomsk (RU); Aleksei Dubov, Moscow (RU); Anna Ivanova, Tomsk (RU)

(73) Assignee: Mighty Buildings, Inc., Oakland, CA (US)

(*) Notice: Subject to any disclaimer, the term of this patent is extended or adjusted under 35 U.S.C. 154(b) by 0 days.

(21) Appl. No.: 16/541,027

(22) Filed: Aug. 14, 2019

(65) Prior Publication Data

US 2020/0199267 A1 Jun. 25, 2020

Related U.S. Application Data

(63) Continuation-in-part of application No. 16/276,521, filed on Feb. 14, 2019.

(60) Provisional application No. 62/630,725, filed on Feb. 14, 2018.

(51) Int. Cl.

| | |
|---|---|
| *C08F 2/50* | (2006.01) |
| *C08K 3/38* | (2006.01) |
| *C08K 5/5397* | (2006.01) |
| *C08K 5/14* | (2006.01) |
| *C08K 3/20* | (2006.01) |
| *C08F 20/32* | (2006.01) |
| *B33Y 30/00* | (2015.01) |
| *B33Y 70/00* | (2020.01) |
| *C08K 3/22* | (2006.01) |
| *B33Y 10/00* | (2015.01) |

(52) U.S. Cl.
CPC .............. *C08F 20/32* (2013.01); *C08F 2/50* (2013.01); *C08K 3/20* (2013.01); *C08K 3/38* (2013.01); *C08K 5/14* (2013.01); *C08K 5/5397* (2013.01); *B33Y 10/00* (2014.12); *B33Y 30/00* (2014.12); *B33Y 70/00* (2014.12); *C08K 2003/2227* (2013.01); *C08K 2003/387* (2013.01)

(58) Field of Classification Search
CPC ...... C08F 20/32; C08F 2/50; C08F 222/1063; C08F 222/103; C08F 122/1006; C08K 3/38; C08K 5/5397; C08K 5/14; C08K 3/20; C08K 2003/387; C08K 2003/2227; C08K 3/013; B33Y 30/00; B33Y 70/00; B33Y 10/00; B33Y 70/10
See application file for complete search history.

(56) References Cited

U.S. PATENT DOCUMENTS

| | | |
|---|---|---|
| 2005/0059757 A1 | 3/2005 | Bredt et al. |
| 2012/0135172 A1* | 5/2012 | De Schrijver ......... C08J 9/0061 428/36.5 |
| 2016/0067921 A1 | 3/2016 | Willis et al. |
| 2017/0369618 A1 | 12/2017 | Gerard et al. |
| 2020/0199267 A1 | 6/2020 | Korshikov et al. |

FOREIGN PATENT DOCUMENTS

WO 2017/112521 A1 6/2017

OTHER PUBLICATIONS

International Search Report in International Application No. PCT/US2020/039997, dated Sep. 28, 2020.

* cited by examiner

*Primary Examiner* — Jessica M Roswell
(74) *Attorney, Agent, or Firm* — Cognition IP, P.C.; Edward Steakley

(57) ABSTRACT

A formulation for a photopolymer composite material for a 3D printing system includes an acrylate monomer or an acrylate oligomer, an inorganic hydrate, a reinforcing filler, a co-initiator, a thermal initiator, and an ultraviolet (UV) initiator. In the formulation the acrylate monomer or the acrylate oligomer may be between about 10.0-30.0 w % of the formulation. The thermal initiator may be between about 0.001-0.05 w %, the co-initiator may be between about 0.001-0.05 w %, and the UV initiator may be between about 0.001-0.2 w % of the formulation. A method of generating a formulation of a photopolymer composite material for use in a 3D printing system includes using an acrylate monomer or an acrylate oligomer, an inorganic hydrate, a reinforcing filler, a co-initiator, a thermal initiator, and an ultraviolet (UV) initiator.

20 Claims, 8 Drawing Sheets

DUAL-MEDIATED POLYMERIZABLE COMPOSITE FOR ADDITIVE MANUFACTURING

CROSS-REFERENCE TO RELATED APPLICATIONS

This application is a continuation-in-part of U.S. patent application Ser. No. 16/276,521, filed Feb. 14, 2019, which claims the benefit of U.S. provisional patent application Ser. No. 62/630,725, filed on Feb. 14, 2018, wherein the contents of all the preceding applications are incorporated herein by reference in their entirety.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the 3D printed articles were generally models, the industry is quickly advancing by creating 3D printed articles that may be functional parts in more complex systems, such as hinges, tools, structural elements.

In existing 3D printing processes, a 3D object is created by forming layers of material under computer control without molding. For example, 3D information of a structure is determined using computer 3D modeling fragmentation and a prepared mixture can be fed from a nozzle by mechanical control to print the structure.

One serious problem and challenge of 3D printing is that printing materials meeting requirements of certain applications can be very scarce. For example, existing printing materials are mainly organic materials. The organic materials are printed in a molten state at a high temperature via layer by layer deposition. Curing of the organic materials is prone to oxidation decomposition, and the preparation and printing processes may emit unpleasant toxic gases that harm the environment and human health. In addition, the organic materials may be printed under demanding conditions which incur high costs. Structures printed with the organic materials may have poor mechanical properties and are therefore not suitable for certain applications such as constructing livable buildings, thus limiting the application of 3D printing technology to a certain extent.

Another example of printing material is cement-based materials such as concrete. Cement-based materials generally take a long time to solidify. Thus, such materials generally cannot meet performance requirements requiring the material to rapidly solidify in a short period of time. Even though the speed of solidification can be increased by changing the formulation, such increase is usually limited or difficult to control and makes 3D printing impractical for certain circumstances such as constructing a building on a construction site.

In view of the foregoing, there is a need for improvements and/or alternative or additional solutions to improve 3D printing materials and processes.

In conventional additive or three-dimensional fabrication techniques, construction of a three-dimensional object is performed in a stepwise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. Photochemical curing, also known as photopolymerization, is an inexpensive and efficient method of additive manufacturing.

The main drawback of light-curing is the limited penetration of light radiation into the irradiated material, which gets even more limited in presence of colored, semi-transparent, or opaque additives, which are frequently used to give the material functional properties. In any known layer-by-layer printing process using polymer materials, the polymer matrix embedded with the composition of the filler must allow UV light penetration depth to be sufficient for a complete layer solidification.

The other issue related to photopolymerization is that non-uniform volume shrinkage may occur upon polymerization, which results in a high level of residual stress and detrimental warpage or curvature of the printed samples. The bulk volume shrinkage in photopolymerization is an unavoidable result of the formation of new covalent bonds via the van der Waals force. As a result, polymerization strains are introduced incrementally, layer-by-layer during 3D printing, thereby giving rise to residual stresses. If the stress exceeds the adhesive strength of any component of the system, micro- or macro-deformations occur (cracking, delamination, etc.) during and after printing.

Retailleau, Ibrahim and Allonas, Polymer Chemistry 5, 6503 (2014), describe UV-curing polymerization of acrylates assisted by a thermal polymerization, but their proposed system requires a significant time to cure at the surface. Thus it does not fit for additive manufacturing, especially for extrusion-based additive manufacturing, and no suggestion is made on how those materials may be adapted to additive manufacturing.

Rolland, and Menio, patent application WO2017040883A1, describe a dual cure cyanate ester resin for additive manufacturing. McCall, patent application WO2017112521A1, describes dual cure polyurethane/polyurea-containing resins for additive manufacturing. Both above-mentioned applications describe combinations of layer-by-layer photopolymerization, preferably DLP or CLIP methods, followed by thermal curing to form two interpenetrating polymer networks. A shortcoming of this method is the need to perform additive manufacturing in two subsequent stages, which increases production time and required labor, and adds additional equipment costs.

Therefore, there is a need to develop a novel composite that will solve the above-mentioned shortcomings of the existing formulations.

BRIEF SUMMARY

This disclosure relates to a formulation for a photopolymer composite material for a 3D printing system comprising at least one of an acrylate monomer and an acrylate oligomer in the range between about 10.0-30.0 w % of the formulation. The formulation further comprises an inorganic hydrate in the range between about 5.0-30.0 w % of the formulation. The formulation further comprises a reinforcing filler in the range between about 50.0-80.0 w % of the formulation. The formulation further comprises an ultraviolet (UV) initiator in the range between about 0.001-0.2 w % of the formulation. The formulation further comprises a thermal initiator in the range between about 0.001-0.05 w % of the formulation. Finally, the formulation comprises a co-initiator in the range between about 0.001-0.05 w % of the formulation.

This disclosure also relates to a method of generating a formulation of a photopolymer composite material for use in a 3D printing system. The method comprises adding at least one of an acrylate monomer and an acrylate oligomer in the range between about 10.0-30.0 w % of the formulation, an ultraviolet (UV) initiator in the range between about 0.001-0.2 w % of the formulation, a co-initiator in the range between about 0.001-0.05 w % of the formulation, an inorganic hydrate in the range between about 5.0-30.0 w % of the formulation, and a reinforcing filler, in the range between about 50.0-80.0 w % of the formulation, in a blender. The method further comprises generating a resin premix by blending the acrylate oligomer, the UV initiator, inorganic hydrate, co-initiator, and the reinforcing filler through operation of the blender for a first amount of time. The method further comprises combining the resin premix with a thermal initiator in the range between about 0.001-0.05 w % of the formulation in the blender. Finally, the method comprises generating a photopolymer composite resin by blending the thermal initiator and the resin premix through operation of the blender for a second amount of time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
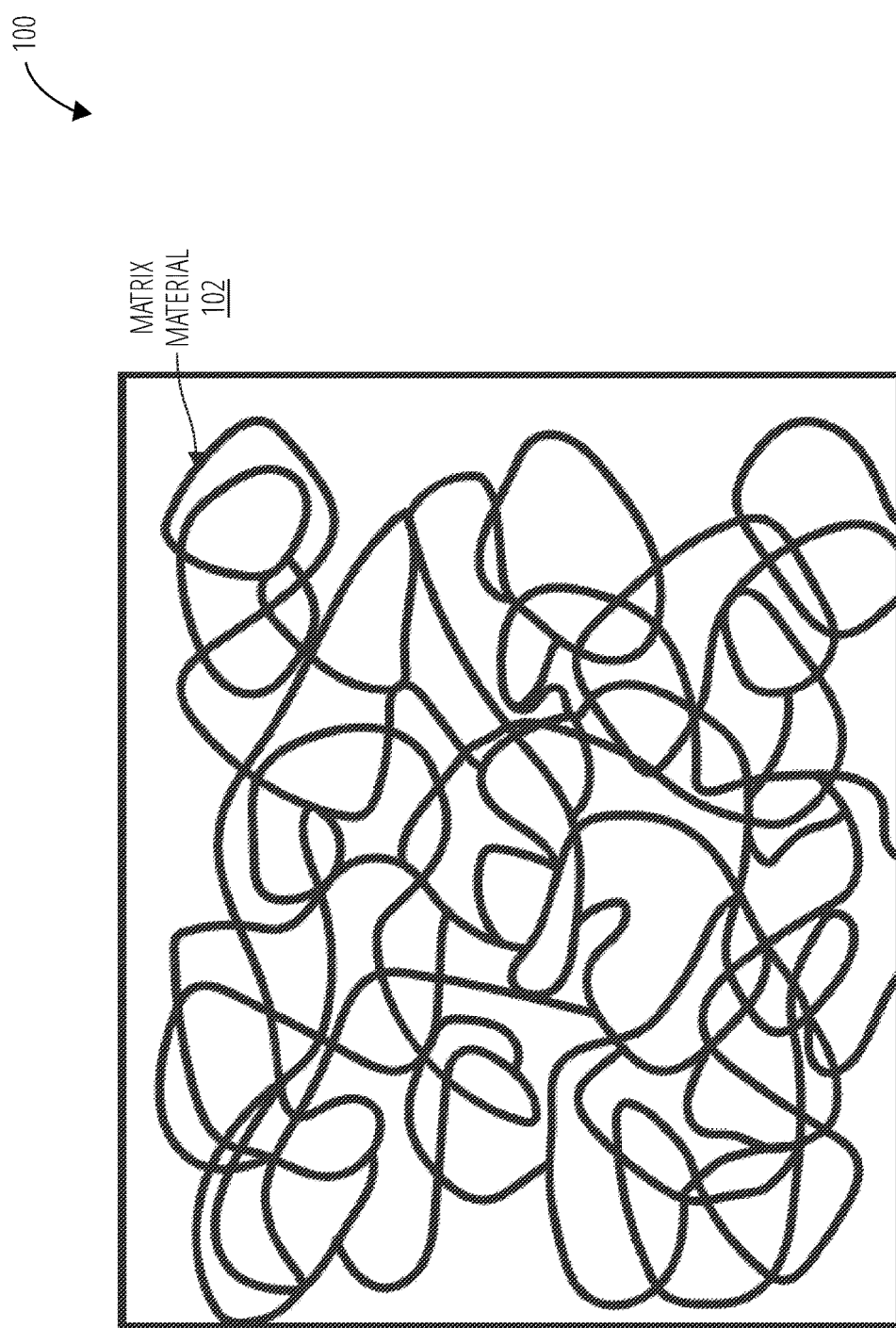
FIG. 1 illustrates an end material 100 in accordance with one embodiment.

A photopolymer composite material construction material combines properties of a polymer matrix and microcrystalline inorganic fillers, which have a monolithic amorphous structure with low porosity. The material comprises a base photopolymer, ensuring layers chemically adhere to each other during the printing process. With the layer-by-layer deposition of the material in the 3D printing process, each new curable layer is firmly fixed to the previous one due to the chemical adhesion between liquid and cured polymer matrix. During experimentation, the photopolymer composite material forms a solid monolithic structure with layer-by-layer curing. Polymer and inorganic parts of the compound act synergistically, the polymer matrix provides high compressive strength, as well as coats the filler particles, protecting them against aggressive environmental exposures (moisture, acids, alkali, etc.). Further, the presence of the inorganic components decreases the plasticity of the photopolymer composite, resulting in higher tensile strength.

TABLE 1

Components of Photopolymer Composite for 3D Printing

| Components | Quantity Ranges |
|---|---|
| Acrylate Oligomer | 20.0 to 60.0 w % |
| Inorganic Hydrate | 20.0 to 70.0 w % |
| Reinforcing Filler | 5.0 to 60.0 w % |
| UV Initiator | 0.001 to 0.2 w % |
| Dye/pigment | 0.001 to 0.05 w % |

Referencing Table 1, a formulation for a photopolymer composite material for a 3D printing system may include an acrylate oligomer, an inorganic hydrate, a reinforcing filler, and an ultraviolet (UV) initiator. In an embodiment of the formulation the acrylate oligomer may be found ranging between about 20.0-60.0 w % of the formulation. The inorganic hydrate may be found ranging between about 20.0-70.0 w % of the formulation. The reinforcing filler may be found ranging between 5.0-60.0 w % of the formulation. And the UV initiator may be found ranging between about 0.001-0.5 w % of the formulation.

In some configurations, the acrylate oligomer may be Triethylene glycol dimethylacrylate (TEGDMA). Some properties of TEGDMA are found in Table 2.

TABLE 2

Triethylene Glycol Dimethacrylate (TEGDMA)

| Parameter | Value |
|---|---|
| Chemical formula | $CH_2$=$C(CH_3)COO(CH_2CH_2O)_3COC(CH_3)$=$CH_2$ |
| Density | 1.092 g/mL |
| Refractive index | 1.46-1.508 |
| State of Matter | Liquid |
| Color | Transparent |

TEGDMA is a hydrophilic, low viscosity, difunctional methacrylic monomer employed as a crosslinking agent. TEGDMA is a transparent liquid that may found ranging between about 20 to 60 w % of the formulation.

In some configurations, the organic matrix may be Trimethylolpropane Trimethacrylate (TMPTMA). Some properties of TMPTMA are found in Table 3.

TABLE 3

Trimethylolpropane Trimethacrylate (TMPTMA)

| Parameter | Value |
|---|---|
| Chemical formula | $[H_2C$=$C(CH_3)CO_2CH_2]_3CC_2H_5$ |
| Density | 1.06 g/ML |
| Refractive index | 1.472 |
| State of Matter | Liquid |
| Color | Yellow |

TMPTMA is a hydrophilic, low viscosity, reactive trifunctional methacrylate suitable for use in a wide-ranging number of polymer cross linking functions. TMPTMA is a transparent liquid that may found ranging between about 10 to 30 w % of the formulation.

In some configurations, the organic matrix may be Poly (ethylene glycol) dimethacrylate (PEGDMA). Some properties of PEGDMA are found in Table 4.

TABLE 4

Poly(ethylene glycol) dimethacrylate (PEGDMA)

| Parameter | Value |
|---|---|
| Chemical formula | $C_3H_5C(O)(OCH_2CH_2)_nOC(O)C_3H_5$ |
| Density | 1.099 g/mL |
| Refractive index | 1.464-1.468 |
| State of Matter | Liquid |
| Color | Transparent |

PEGDMA is a long-chain hydrophilic, crosslinking monomer. PEGDMA is a transparent liquid that may found ranging between about 10 to 30 w % of the formulation.

In some configurations, the inorganic hydrate may be borax decahydrate. Some properties of borax decahydrate may be found in Table 5.

TABLE 5

Borax Decahydrate

| Parameter | Value | |
|---|---|---|
| Chemical formula | $Na_2B_4O_7 \cdot 10H_2O$ | |
| State of Matter | Solid Powder | |
| Volume weight | 0.85 g/cm³ | |
| Initial decomposition temperature | 60-70° C. | |
| Refractive index | 1.46-1.47 | |
| Foreign impurities | No impurities | |
| Particle size distribution | D (10) | 110 ± 20 μm |
| | D (50) | 310 ± 40 μm |
| | D (90) | 700 ± 120 μm |
| | D max | 2800 ± 300 μm |
| Solubility in organic matrix | Insoluble | |

The inorganic hydrate may be a borax decahydrate such as sodium borate decahydrate. Borax decahydrate is a solid white powder that may be provided in large bags for industrial use. Borax decahydrate may be found ranging between about 22.0 to 25.0 w % of the formulation when combined with aluminum oxide trihydrate but is not limited thereto. In some embodiments, the borax decahydrate may be found ranging between 20.0 to 45.0 w % of the formulation.

In some configurations, the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof. Some properties of the aluminum oxide trihydrate that may be shared with the aluminum oxide trihydrate mixture may be found in Table 6.

TABLE 6

Aluminum Oxide Trihydrate

| Parameter | Value | |
|---|---|---|
| Chemical formula | $Al(OH)_3$ | |
| State of Matter | Solid Powder | |
| Volume weight | 0.7 g/cm³ | |
| Refractive index | 1.56-1.58 | |
| Foreign impurities | No impurities | |
| Particle size distribution | D (10) | 5 ± 1 μm |
| | D (50) | 25 ± 5 μm |
| | D (90) | 8.5 ± 15 μm |
| | D max | 200 ± 50 μm |
| Solubility in organic matrix | Insoluble | |

Aluminum oxide trihydrate, (aluminum hydroxide, (Al(OH)3)) is provided as a solid white powder that is insoluble in the acrylate oligomer. The aluminum oxide trihydrate may be found ranging between about 52.0 to 55.0 w % of the formulation.

In some configurations, the UV initiator may be bisacylphosphine oxides (BAPO)s. Some properties of the BAPO may be found in Table 7.

TABLE 7

Bisacylphosphine oxides (BAPO)

| Parameter | Value |
|---|---|
| Chemical formula | Phenylbis(2,4,6-trimethylbenzoyl)phosphine oxide |
| State of Matter | Solid Powder |
| Color | Yellowish |
| Solubility in organic matrix | High solubility |

The UV initiator is the component which starts the polymerization under UV-light of a specified wavelength.

In some configurations, a dye may be found ranging between about 0.01 to 0.05 w % of the formulation. Properties of photopolymer composite resin are dependent on the quantity of the components utilized in the formulation. When uncured, the material is thixotropic liquid. The material may be transported through the feeding route by pumps, then extruded, and then it solidifies under UV-light. When being exposed to UV-light, the substance, which is called an initiator, starts the polymerization reaction, which is exothermic. Table 8 illustrates some properties of the photopolymer composite resin.

TABLE 8

Properties of Liquid Polymer Resin of the Photopolymer Composite

| Parameter | Value |
|---|---|
| Density | 1.35 to 2.00 g/cm³ |
| Maximum cure depth under visible UV light | 5-15 mm |
| Maximum temperature during polymerization | 60-65° C. |

In some configurations, the upper limit of the density of the liquid polymer resin may be higher, as the density of liquid polymer resin may be due to limitations of the feeding system. In some instances, the upper limit of the density may also be determined by the bulk weight of the fillers utilized in the formulation.

A method of generating a formulation of a photopolymer composite material for use in a 3D printing system may involve combining an acrylate oligomer, ranging between about 20.0 to 60.0 w % of the formulation, an ultraviolet (UV) initiator, ranging between about 0.001 to 0.5 w % of the formulation, and a reinforcing filler, ranging between 5.0 to 60.0 w % of the formulation, in a blender. In the method, a resin premix may be generated by blending the acrylate oligomer, the UV initiator, and the reinforcing filler through operation of the blender for a first amount of time ranging between about 5 and 20 minutes. In the method, the resin premix may be combined with an inorganic hydrate ranging between about 20.0 to 70.0 w % of the formulation in the blender. In the method, a photopolymer composite resin may be generated by blending the inorganic hydrate and the resin premix through operation of the blender for a second amount of time ranging between about 10 and 14 hours.

In some instances, the photopolymer composite resin is loaded from the blender into a mixing tank of a 3D printing system. In some instances, the photopolymer composite resin may be loaded from the blender into a second drum for storage. The photopolymer composite resin may then be mixed in the second drum with a mixer after a time interval ranging between 3 hours to 7 days. A mixed photopolymer composite resin may then be transferred from the second drum into the mixing tank of a 3D printing system. In some configurations, the photopolymer composite resin is combined with a dye ranging between about 0.01-0.05 w % of the formulation in the second drum through operation of the mixer.

In some configurations, the acrylate oligomer may be Triethylene glycol dimethylacrylate (TEGDMA) and may be found ranging between about 23.0 to 27.0 w % of the formulation. In some configurations, the inorganic hydrate may be borax decahydrate and may be found ranging between about 22.0 to 25.0 w % of the formulation. In some configurations, the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof. In some configurations, the aluminum oxide trihydrate may be found ranging between about 52.0 to 55.0 w % of the formulation. In some configurations, the UV initiator may be bisacylphosphine oxides (BAPO)s.

The present invention is related to a new composition that comprises a polymer matrix, inorganic fillers and a complex of polymerization initiating agents, providing a stable single-stage 3D printing process. In some embodiments, the invented composition may include a flexible variation of the printing speed and embed into the polymer matrix the mineral fillers of different nature, including semi-transparent, opaque, and colored particles.

To resolve the existing issues, the dual cure process may be implemented by using the co-initiation system, including the use of photo initiators, thermal initiators and others. The application of dual initiation system may open opportunities for the on-demand curing of polymer materials. A composite material may combine properties of a polymer matrix and microcrystalline inorganic fillers. The material may comprise a base acrylate monomer and/or acrylate oligomer, filler composition, and a system of co-initiating agents of photo- and thermal-polymerization, which may induce a dual-cure reaction of the monomer/oligomer ensure a stable printing process.

With the layer-by-layer deposition of the material in the 3D printing process, each newly deposited layer may undergo consistent photo- and thermal-polymerization curing. Properties of photopolymer composite resin may depend on the quantity of the components utilized in the formulation. When uncured, the material may be a thixotropic liquid. The material may be transported through the feeding route by pumps and then extruded. When exposed to UV light, a photo-initiator or UV initiator may begin the polymerization reaction, causing a cured shell to form on the surface of the deposited layer, while the core remains uncured. Through the UV curing of the shell, each newly deposited layer may firmly adhere to the previous layer, preserving layer dimensions and form.

The combination of the thermal initiator with an appropriate promoter (co-initiator) may allow thermal polymerization to proceed at a relatively low temperature. Because photopolymerization is an exothermic process, it may induce the sequential process of thermal initiation, which may prolong the polymerization time (the polymerization stress relaxation period). Prolonging the polymerization time may reduce or eliminate deformations and may make the volume shrinkage more uniform and controllable. As a result, a layer-by-layer structure may be formed with high adhesion between the layers, reduced anisotropy, and, consequently, enhanced mechanical performance. Thus, this dual cure technique may solve the most important issues occurring during 3D-printing by photopolymerization.

TABLE 9

Components of Dual-Cure Composite for 3D Printing

| Components | Quantity Ranges |
| --- | --- |
| Organic Matrix | 10.0 to 30.0 w % |
| Inorganic Hydrate | 5.0 to 30.0 w % |
| Reinforcing Filler | 50.0 to 80.0 w % |
| UV Initiator | 0.001 to 0.2 w % |
| Thermal Initiator | 0.001 to 0.05 w % |
| Co-initiator | 0.001 to 0.05 w % |
| Dye/pigment | 0.001 to 0.05 w % |

Referencing Table 9, a formulation for a composite material to be used in dual cure 3D printing may include an organic matrix comprising at least one of an acrylate monomer and an acrylate oligomer. The formulation may further comprise an inorganic hydrate, a reinforcing filler, a UV initiator, and a combination of thermal initiator and co-initiator (activator). In an embodiment of the formulation, the organic matrix may be found ranging between about 10.0 to 30.0 w % of the formulation. The inorganic hydrate may be found ranging between about 5.0 to 30.0 w % of the formulation. The reinforcing filler may be found ranging between about 50.0 to 80.0 w % of the formulation. The UV initiator may be found ranging between about 0.001 to 0.2 w % of the formulation. The thermal initiator in conjunction with the co-initiator in various ratios may be found ranging between about 0.002 to 0.1 w % of the formulation (the summation of each component being found ranging between about 0.011 to 0.05 w %).

In some configurations, the organic matrix may be Triethylene glycol dimethacrylate (TEGDMA). Some properties of TEGDMA are found in Table 2 above. TEGDMA is a hydrophilic, low viscosity, difunctional methacrylic monomer employed as a crosslinking agent. TEGDMA is a transparent liquid that may found ranging between about 10 to 30 w % of the formulation. An exemplary matrix may include different polymeric materials. Alternative polymeric materials may include TMPTMA, as described in Table 3, and PEGDMA, as described in Table 4. In one embodiment, the polymeric material may include one or more acrylic oligomers. In an exemplary embodiment, the acrylate oligomer is a mixture of Trimethylolpropane Trimethacrylate (TMPTMA) and Triethylene glycol dimethylacrylate (TEGDMA) and is found in the range between about 10.0-30.0 w % of the formulation. In another embodiment, an exemplary matrix material may be pre-polymerized in order to enhance the viscosity of the composite.

In some configurations, a combination of inorganic fillers comprising at least one reinforcing filler and inorganic hydrate may be used. The inorganic hydrate may be an inorganic mineral possessing the initial dehydration temperature range needed to keep the composite temperature below the autocatalytic threshold during printing and a refractive index conforming the refractive index of the cured organic matrix. In the disclosed formulation, temperature control is achieved by a combination of the matrix and the fillers. The inorganic additives (inorganic hydrates) are characterized by a certain set of thermophysical properties (decomposition temperature, heat capacity, thermal conductivity), which maintain the maximum temperature of the material below the autocatalytic threshold during printing.

In some configurations, the inorganic hydrate may be borax decahydrate. Some properties of borax decahydrate may be found in Table 5 above. Borax decahydrate is a solid white powder that may be provided in large bags for industrial use. Borax decahydrate may be found ranging between about 5.0 to 30.0 w % of the formulation when combined with the reinforcing filler but is not limited thereto.

In some configurations, the reinforcing filler may comprise aluminum oxide trihydrate or an aluminum oxide trihydrate mixture with at least one of calcium carbonate, talc, silica, wollastonite, calcium sulfate fibers, mica, glass beads, and glass fibers. Some properties of aluminum oxide trihydrate and aluminum oxide trihydrate mixtures may be found in Table 6 above. Aluminum oxide trihydrate is a solid white powder that may be provided in large bags for industrial use. Aluminum oxide trihydrate may be used as a flame retardant and reinforcing filler for the polymer matrix.

In some configurations, the UV initiator may be bisacylphosphine oxides (BAPOs). Some properties of BAPO may be found in Table 7 above. The UV initiator may induce the polymerization of the organic matrix under UV-light of a specified wavelength.

In some configurations, the thermal initiator may be benzoyl peroxide (BPO). Some properties of BPO may be found in Table 10.

TABLE 10

| Benzoyl Peroxide (BPO) | |
| --- | --- |
| Parameter | Value |
| Chemical formula | $C_{14}H_{10}O_4$ |
| State of Matter | Solid Powder |
| Color | White |
| Solubility in TEGDMA | 15 w %, 23° C. |

The thermal initiation may be launched by decomposition of the BPO catalyzed by the amine activator.

The co-initiator may be Bisomer PTE. Some properties of co-initiator are given in Table 11.

TABLE 11

| Bisomer PTE | |
| --- | --- |
| Parameter | Value |
| Chemical formula | N,N-BIS-(2-HYDROXY-ETHYL)-PARA-TOLUIDINE |
| State of Matter | Liquid |
| Color | Dark Orange |
| Solubility in TEGDMA | High Solubility |

In some configurations, the co-initiator may be added into a formulation in advance or may be dissolved in a suitable organic solvent separately from the composition mixture and added into a formulation right before extrusion. The three-dimensional object is formed from the composite resin premix containing components described above by additive manufacturing process, typically layer-by-layer extrusion additive manufacturing.

The formulation may be created following the method disclosed herein. A resin premix may be generated by blending the acrylate monomers and/or acrylate oligomers, the UV initiator, the thermal initiator, the thermal co-initiator, and the fillers through operation of the blender for a first amount of time. The photopolymer composite resin may then by created by blending the thermal initiator and the resin premix for a second amount of time. Methods of generating the formulation are described in further detail with regard to FIG. 6 and FIG. 7.

FIG. 1 shows an exemplary end material 100 that may be produced via 3D printing. The end material 100 is shown as including a matrix material 102. The matrix material 102 may be formed via 3D printing.

Exemplary matrix material 102 may include a polymeric material. In one embodiment, the polymeric material may include one or more acrylic polymers. An exemplary acrylic polymer may include any polymer that is a product of polymerization of an acrylic acid, an acrylate (or ester of an acrylic acid), and/or a derivative thereof.

The end material 100 may be formed by any suitable methods. An exemplary method may include polymerization. Exemplary polymerization may include photopolymerization, such as radical photopolymerization. In one embodiment, the end material 100 may be formed by a 3D printing process that is based on photopolymerization. Exemplary 3D printing process may include stereolithography (or SLA, SL, optical fabrication, photo-solidification, resin printing), binder jetting, directed energy deposition, material jetting, powder bed fusion, sheet lamination, vat photopolymerization, or a combination thereof.

Figure 2:
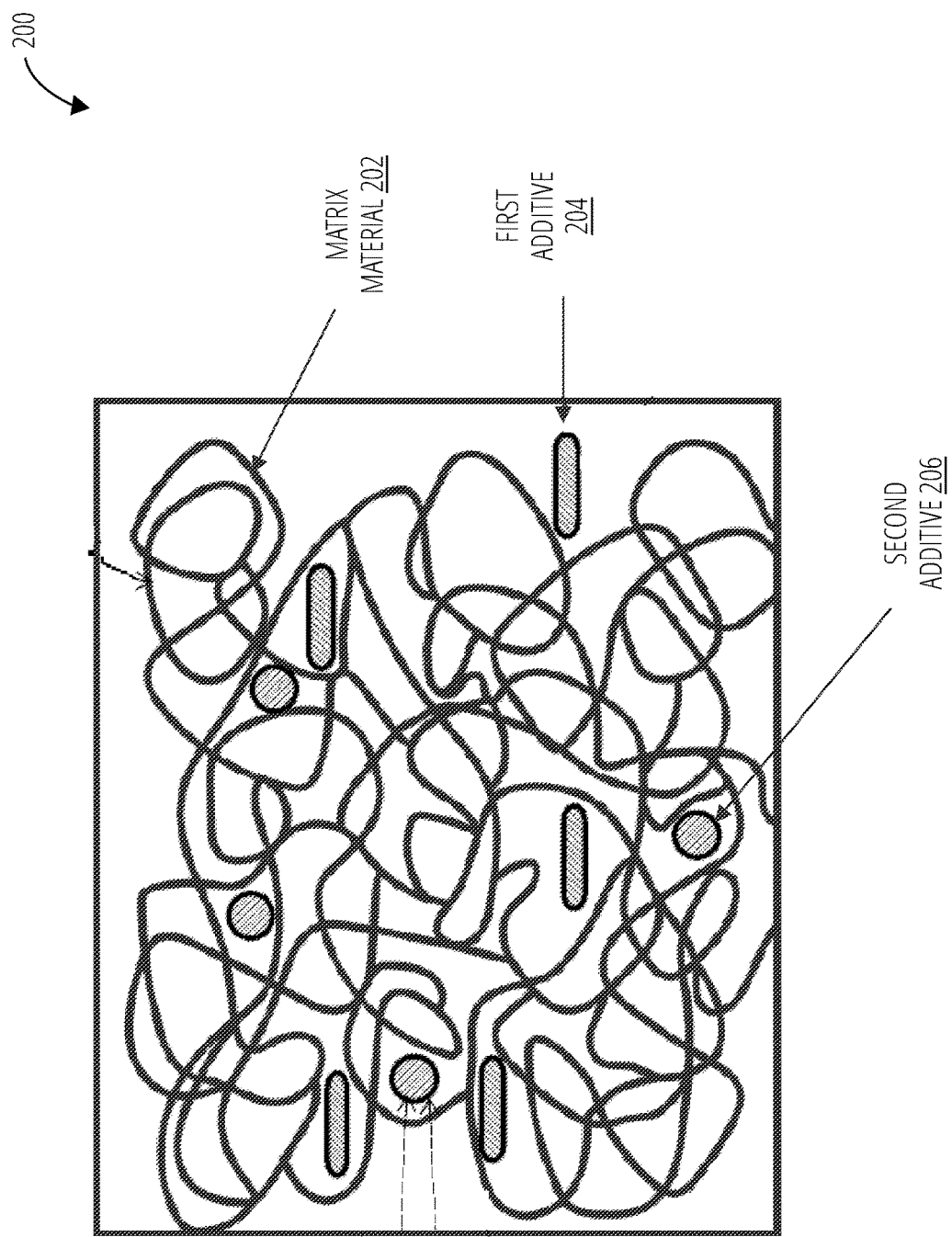
FIG. 2 illustrates an end material 200 in accordance with one embodiment.

Referencing FIG. 2, the end material 200 is shown as including at least one additive each being embedded and/or mixed within the matrix material 202 at a selected concentration, respectively. Each additive may include particles and/or compounds that possess one or more selected properties. Advantageously, the properties of the additive may be imparted to the end material 200. As illustratively shown in FIG. 2, the additive in one embodiment may include a first additive 204 and a second additive 206. Each of the first additive 204 and second additive 206 may provide a respective function to the end material 200.

In one embodiment, the additive may include a reinforcing additive. The reinforcing additive may improve mechanical properties of the end material 200. For example, the reinforcement additive may increase tensile, flexural, and compressive strength of the end material 200 and/or decrease shrinkage of the end material 200 before and after 3D printing. Exemplary reinforcing additive may include calcium carbonate, talc, silica, wollastonite, clay, calcium sulfate fibers, mica, glass beads, glass fibers, or a combination thereof. The reinforcing additive may be mixed in the end material 200 in the form of particles. The reinforcing additive particles may be in the form of round and freeform granules, microcrystals of various shapes, fibers, threads, or a combination thereof. The reinforcing additive may be embedded in the end material 200 at any suitable concentrations. For example, mass percentage (or weight percentage) of the reinforcing additive in the end material 200 may range between about 5 to 70 w %, or from 30 to 50 w % of the end material 200.

Additionally and/or alternatively, the at least one additive may include a flame-retardant additive. In one embodiment, the flame-retardant additive may be mineral-based and/or mineral-occurred. Stated somewhat differently, the flame-retardant additive may be of a natural origin. For example, the flame-retardant additive may be derived from a mineral. Exemplary flame-retardant additives may include aluminum oxide trihydrate, sodium tetraborate decahydrate, boric acid, sodium phosphate, ammonium sulfate, sodium tetraborate, aluminum hydroxide, or a combination thereof. In contrast to common halogen-based flame retardants, use of the mineral-based flame-retardant additive may eliminate the presence of toxic substances in combustion products and advantageously be environmentally beneficial.

Additionally and/or alternatively, the mineral-based flame-retardant additive may be more resistant to blooming than non-mineral-based flame retardants, including phosphoric acid esters, aluminum polyphosphate, red phosphorus, and other halogen-free flame retardants. Advantageously, the functional stability of the end material 200 does not degrade with the passage of time. The flame-retardant additive may be embedded in the end material 200 in the form of particles. The reinforcing additive particles may be in the form of round and freeform granules, microcrystals of various shapes, or a combination thereof. The flame-retardant additive may be mixed in the end material 200 at any suitable concentrations. For example, mass percentage of the flame-retardant additive in the end material 200 may range between about 35 to 75 w %, or from about 45 to 65 w % of the end material 200.

Additionally and/or alternatively, the at least one additive may include a coloring agent for coloring the end material 200. Exemplary coloring agents may include a pigment, a dye, or a combination thereof. Additionally and/or alternatively, the at least one additive may include a glittering agent for providing a glittering effect to the appearance of the end material 200. Additionally and/or alternatively, the at least one additive may include an aromatic agent for generating an aromatic smell from the end material 200. Advantageously, the end material 200 may have a monolithic amorphous structure with low porosity. The end material 200 may be stronger and lighter than concrete and brick, and resistant to moisture and chemicals. Exemplary end material 200 may be made by curing non-toxic acrylic-based oligomers and a minimal quantity of photoinitiator, so the making of end material 200 may be safer for health.

Although FIG. 2 shows the end material 200 as including the first additive 204 and the second additive 206 for illustrative purposes only, the end material 200 may include no additives, or may include any number of uniform and/or different additives, without limitation. Use of the same matrix material 202 with various combinations of the additives in the end material 200 allows obtaining the end material 200 for a wide range of applications.

Figure 3:
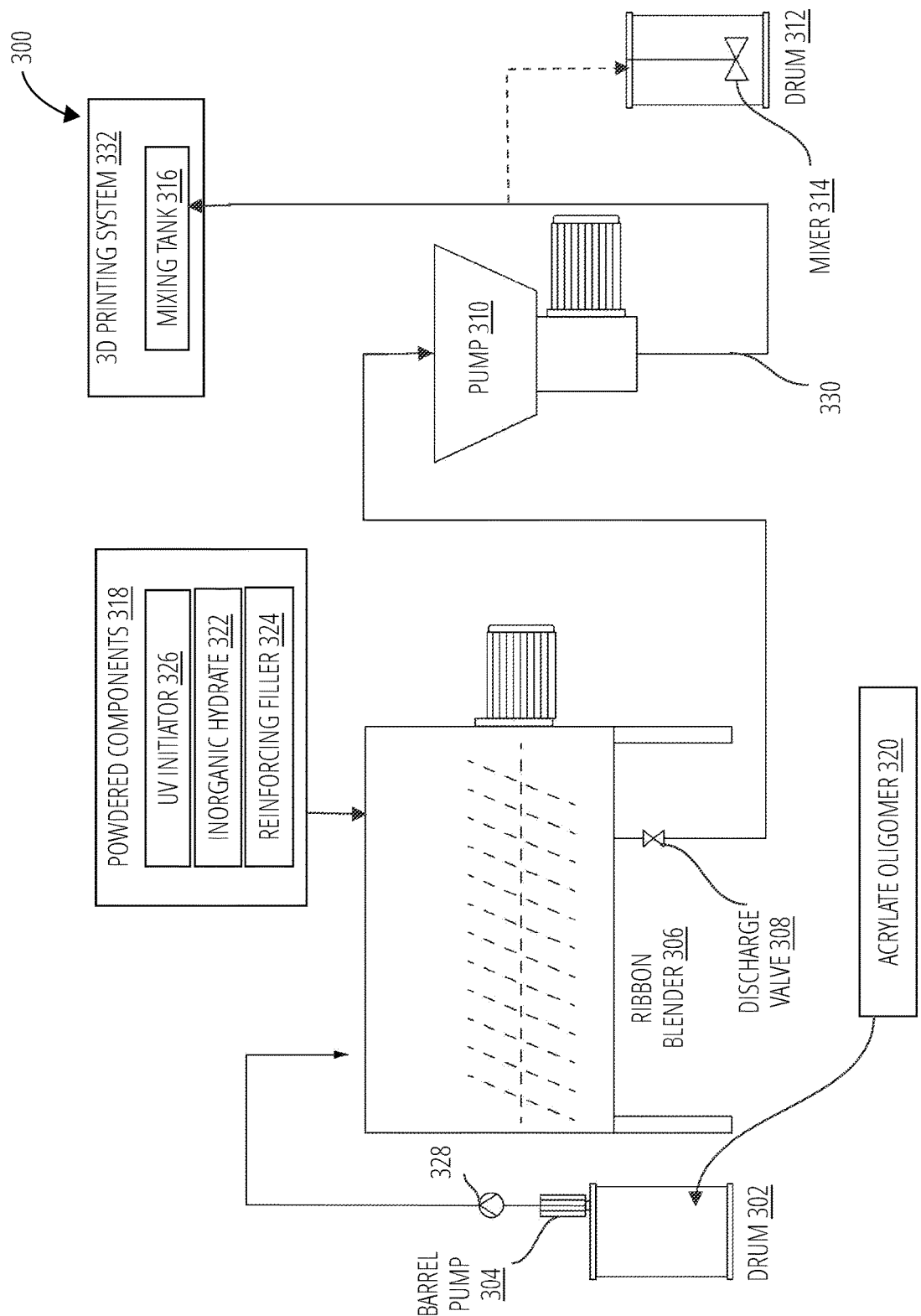
FIG. 3 illustrates a system 300 in accordance with one embodiment.

FIG. 3 illustrates an embodiment of a system 300 for generating the photopolymer composite resin for use in a 3D printing system. The system 300 comprises a drum 302 a barrel pump 304, a flow meter 328, a ribbon blender 306, a discharge valve 308, a pump 310, and a mixing tank 316 of a 3D printing system 332.

A drum 302 comprising the acrylate oligomer 320 may be moved to the location of the barrel pump 304. The lid of the drum 302 is cleaned to remove any dust. A special tool to remove the barrel cap (the larger of the two on the drum's lid) is utilized and placed on the lid of the drum. The level of acrylate oligomer 320 inside the drum is measured and should be between about 1-3" from the top. A barrel pump 304 is installed into the cap hole of the barrel in a vertical position. The barrel pump 304 is placed in fluid communication with a ribbon blender 306 that has been emptied and has the discharge valve 308 in the "closed" position. The barrel pump 304 is activated and the flow rate of the acrylate oligomer 320 into the ribbon blender 306 is monitored through a flow meter 328. The barrel pump 304 is turned off soon as the required volume of the acrylate oligomer 320 is reached inside the ribbon blender 306. If the drum 302 is emptied during the pumping procedure, the barrel pump 304 is turned off and is reinstalled onto the next drum to continue pumping.

After the acrylate oligomer is added to the ribbon blender 306, the powdered components 318 may be added into the ribbon blender. The powdered components 318 may comprise the UV initiator 326, the inorganic hydrate 322, and the reinforcing filler 324.

The UV initiator 326 may be added to the acrylate oligomer 320 within the ribbon blender 306 ranging between about 0.001 to 0.2 w % of the formulation. The UV initiator 326 is loaded into the ribbon blender 306. The empty container of the UV initiator is weighed to ensure that the desired amount of UV initiator 326 was added to the ribbon blender 306. If some amount of UV initiator was not loaded into the ribbon blender 306, the loading procedure should be repeated. After the UV initiator 326 has been added, the container is closed to protect the powder from sunlight and moisture.

The reinforcing filler 324 may be added after the UV initiator 326. In some instances, the reinforcing filler 324 comes in 55 lb bags. To ensure that the correct amount of the reinforcing filler 324 is added, the bag of the reinforcing filler 324 is placed on a floor scale and weighted to obtain the total mass of the load. A safety grating is installed within the ribbon blender 306, and the bag of the reinforcing filler 324 is opened and loaded into the ribbon blender 306 through the safety grating. When the bag is emptied after loading, the empty bag is weighed. A calculation is performed to calculate the mass of reinforcing filler inside the ribbon blender 306 by subtracting the weight of the emptied bag from the total mass weight taken initially. Additional quantities of the reinforcing filler are added to the ribbon blender 306 to meet the quantity range of about 5.0 to 60.0 w % of the formulation. The ribbon blender 306 is then turned on for about 10 minutes to form a premix resin from the components before adding the inorganic hydrate.

The inorganic hydrate 322 may be added after the reinforcing filler 324. In some instances, the inorganic hydrate 322 comes in 55 lb bags. To ensure that correct amount of the inorganic hydrate 322 is added, the bag of the inorganic hydrate 322 is placed on a floor scale and weighted to obtain the total mass of the load. A safety grating is installed within the ribbon blender 306, and the bag of the inorganic hydrate 322 is opened and loaded into the ribbon blender 306 through the safety grating. When the bag is emptied after loading, the empty bag is weighed. A calculation is performed to calculate the mass of inorganic hydrate inside the ribbon blender 306 by subtracting the weight of the emptied bag from the total mass weight taken initially. Additional quantities of the inorganic hydrate are added to the ribbon blender 306 to meet the quantity range of about 20.0 to 70.0 w % of the formulation. Once the desired quantity has been loaded into the ribbon blender 306, the ribbon blender 306 is powered on to run for 12 hours in order to mix the components.

The ribbon blender 306 is turned off and allowed to stop after running for about 12 continuous hours. The pump 310 is then positioned underneath a discharge valve 308 of the ribbon blender 306. In an embodiment, the pump 310 is then connected to the mixing tank 316 of a large gantry 3D printing system 332 through the use of a hose 330. Any appropriate 3D printing system may be used, and the disclosure is not limited to the large gantry 3D system. The gantry system (GS) mixing tank 316 is inspected to ensure that it is operational and that ready to receive the mixed components as a resin. The pump is turned on before the discharge valve 308 is moved into the "open" position. The GS mixing tank is then inspected to ensure that the photopolymer composite resin is being collected. As soon as the flow rate of the resin pouring from the ribbon blender 306 starts to decrease, the ribbon blender 306 is turned on to push the remnants of the resin into the pump's hopper. The pumping procedure ends when the ribbon blender 306 is emptied, at which point the blender and the pump are turned off.

In some instances, the GS mixing tank 316 may be unavailable to receive the photopolymer composite resin, and the resin may be loaded into a storage drum 312. The hose connected to the pump is positioned and secured within the storage drum 312 instead of the GS mixing tank. The pump is turned on before the discharge valve 308 is moved into the "open" position. As soon as the flow rate of the resin pouring from the ribbon blender 306 starts to decrease, the ribbon blender 306 is turned on to push the remnants of the resin into the pump's hopper. The photopolymer composite resin from the ribbon blender 306 may be pumped into at least one storage drum 312 due to total volume of the resin within the blender. If a pump cannot be used, an empty drum is placed underneath the discharge valve 308 and the discharge valve 308 is opened to pour the photopolymer composite resin into the drum. The discharge valve 308 is then closed as soon as the drum is full.

Before printing with the photopolymer composite resin stored in a storage drum 312, the resin requires some mixing. A mixer 314 such as a manual mixer may be utilized to mix the resin before transferring the resin to a GS mixing tank. The lid of the storage drum 312 may be opened and the paddle of the mixer may be positioned into the drum between the center of the drum and the inner wall. The upper layer of the resin may be mixed by moving the paddle clockwise while it is on. The upper layer of the resin is mixed until the upper layer of the drum becomes homogenous. The paddle may then be pushed to the bottom of the drum. The bottom layer may then be mixed by moving the paddle outward from the center. The paddle may then be lifted towards the upper layer of the resin near the inner wall of drum and pushed back down towards the bottom of the drum while being moved in a counterclockwise rotation around the center of the drum. The mixing continues until the resin is homogenous.

To prevent the contamination of the inner surface of the blender with the dye, which will influence the production of uncolored resin, the coloring procedure may be carried in one of the storage drums, which may then be labeled in accordance with the color of the dye used.

The necessary amount of dye is weighed out and placed into a layer of resin within the drum. A manual mixer may be utilized to mix the dye with the photopolymer composite resin. After the dye has been added, the resin in the drum may be mixed again after about 24 hours of storage before it is ready to be transferred to the GS mixing tank for use in 3D printing.

After about 12 hours of continuous mixing, the photopolymer composite resin may be considered to be ready for use. The photopolymer composite resin may require handling while in storage. In cases when the resin is pumped into the GS mixing tank, it may be mixed continuously until it is all consumed. Up to about 3 hours without mixing is acceptable. In cases where the resin is kept in drums for long-term storage, the following requirements must be met:
Drums must be sealed at all times
Avoid exposing the resin to light and moisture
No foreign impurities are allowed in the drum
Once every 7 days, the resin may be manually mixed
No printing with the resin is possible after about 3 hours of staying unmixed In some instances, the resin undergoes a quality assurance process. After the resin has been mixed for about 12 continuous hours, a 500 mL batch is taken for testing. Three samples are to be obtained while pumping the batch out from the ribbon blender. All samples are to be taken from the hose end to the GS mixing tank or in the second drum.

The first sample may be taken in the amount of about 150 to 200 mL at 10 to 15 seconds after the start of the pumping procedure. The second sample may be taken in the amount of about 150 to 200 mL in the middle of the pumping procedure. The third sample may be taken in the amount of about 150 to 200 mL at 10 to 15 seconds before the end of the pumping procedure.

In case of drum storage, the sampling procedure is as follows:
A first sample of about 150 to 200 mL may be taken from the first drum
A second sample of about 150 to 200 mL may be taken from the second drum
A third sample of about 150 to 200 mL may be taken from the third drum The storage produced utilized three different drums since a single load of the mixer may be equal to three drums volume. About 100 mL from each sample may be put into a glass or PE container, mixed well, and sealed for the QA procedures.

Figure 4:
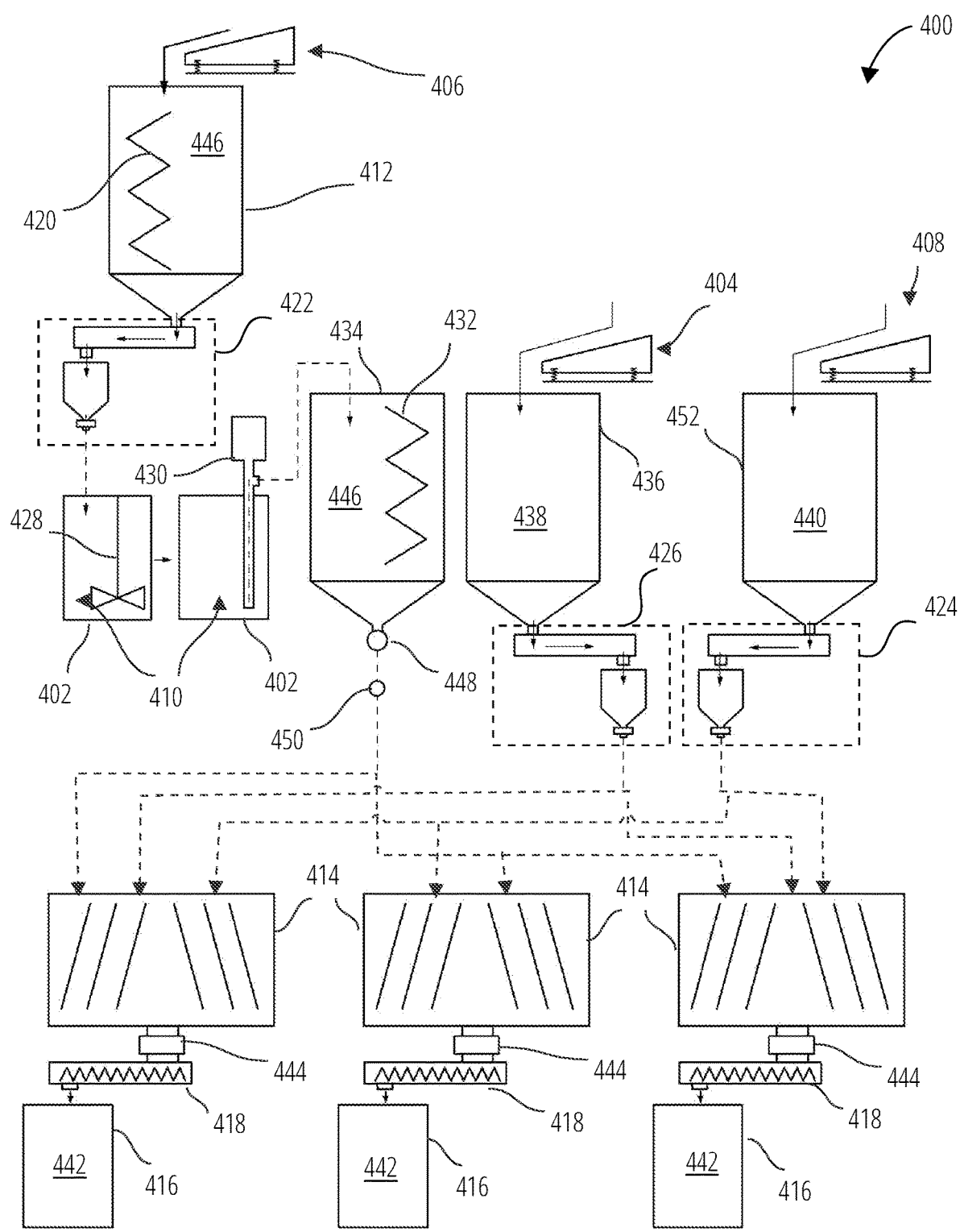
FIG. 4 illustrates a system 400 in accordance with one embodiment.

FIG. 4 illustrates an example embodiment of an industrial system 400 for producing the photopolymer-based composite material formulation. The system 400 is an example of a configuration for handling large volumes of the initial compounds utilized in the production of the formulation. In the system 400, an oscillating sleeve 406 feeds the initiator oligomer mixture 446 into a hopper 412 at a controlled speed. An agitator 420 within the hopper 412 is utilized to feed the initiator oligomer mixture 446 into a dosing machine 422 comprising a feeder, a weight hopper, and a valve, that feeds the initiator oligomer mixture 446 into a drum 402 comprising the acrylate oligomer 410. A mixer 428 is placed into the drum 402 and mixes the acrylate oligomer 410 and the initiator oligomer mixture 446. After the initiator oligomer mixture 446 and the acrylate oligomer 410 have been mixed, a drum pump 430 transfers the mixture (initiator oligomer mixture 446) from the drum 402 into a hopper 434. The hopper 434 includes an agitator 432 that keeps the initiator oligomer mixture 446 from separating. Concurrently, an oscillating sleeve 404 is utilized to load the reinforcing filler 438 into a hopper 436, and an oscillating sleeve 408 is utilized to load the inorganic hydrate 440 into a hopper 452.

Following the loading of hopper 434, hopper 436, and hopper 452, a pump 448 transports the initiator oligomer mixture 446 from the hopper 434 to a plurality of ribbon blenders 414, with the flow of the initiator oligomer mixture 446 being monitored by a flow meter 450. A dosing machine 426 transfers the reinforcing filler 438 from the hopper 436 to the plurality of ribbon blenders 414, and a dosing machine 424 transfers the inorganic hydrate 440 from the hopper 452 to the plurality of ribbon blenders 414. The plurality of ribbon blenders 414 blends the initiator oligomer mixture 446 with the inorganic hydrate 440 and the reinforcing filler 438 for a period of time until the formulation 442 is released through a valve 444 into a feeder 418 that loads the formulation 442 into at least one GS mixing tank 416.

Figure 5:
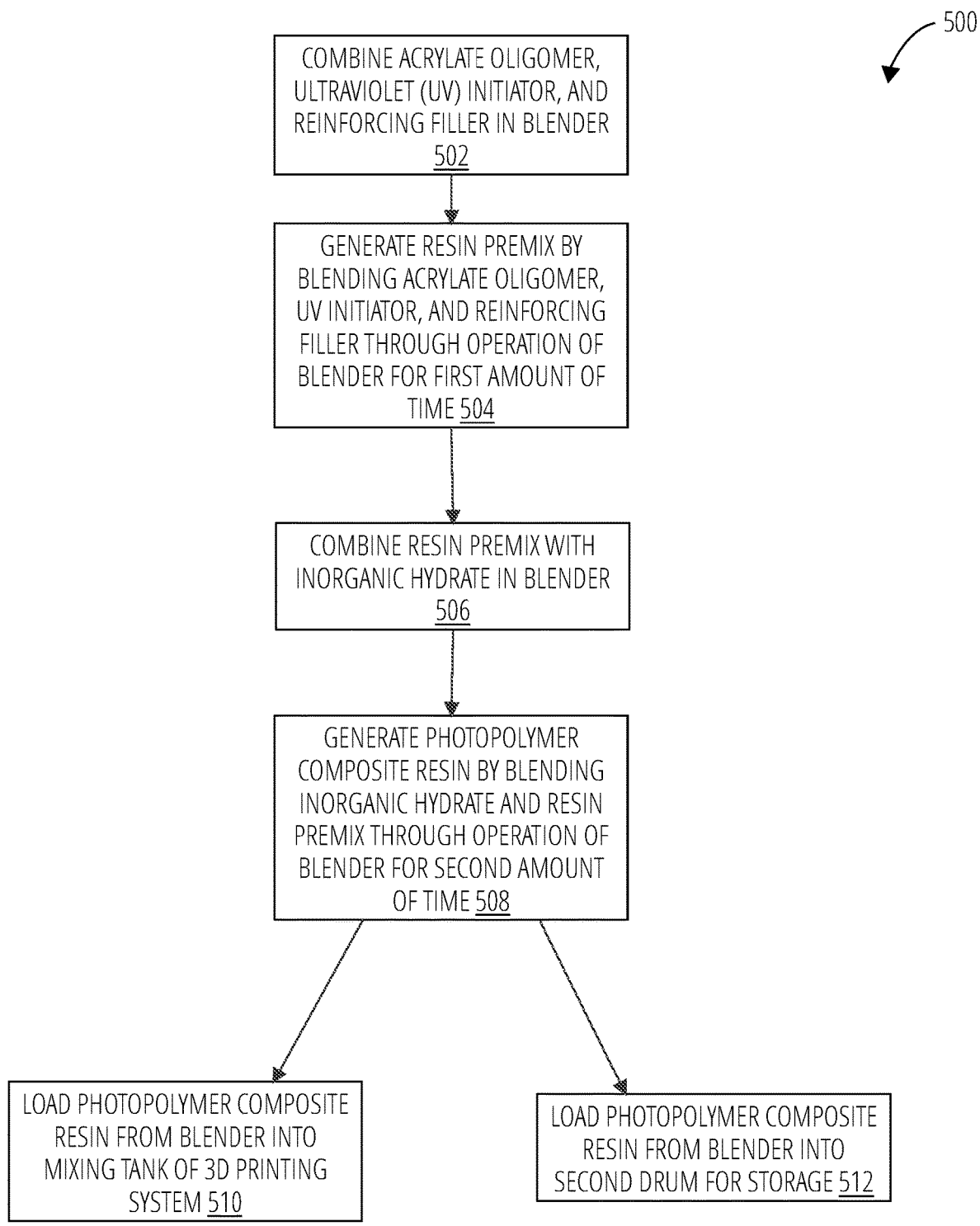
FIG. 5 illustrates a method 500 in accordance with one embodiment.

Referencing FIG. 5, a method 500 of generating a formulation of a photopolymer composite material for use in a 3D printing system involves combining an acrylate oligomer ranging between about 20.0 to 60.0 w % of the formulation, an ultraviolet (UV) initiator ranging between about 0.001 to 0.5 w % of the formulation, and a reinforcing filler ranging between about 5.0 to 60.0 w % of the formulation, in a blender (block 502). In block 504, the method 500 generates a resin premix by blending the acrylate oligomer, the UV initiator, and the reinforcing filler through operation of the blender for a first amount of time ranging between about 5 and 20 minutes±0.5 minutes. In block 506, the method 500 combines the resin premix with an inorganic hydrate ranging between about 20.0 to 70.0 w % of the formulation in the blender. In block 508, the method 500 generates a photopolymer composite resin by blending the inorganic hydrate and the resin premix through operation of the blender for a second amount of time ranging between about 10 and 14 hours±0.1 hours.

In some configurations, the method 500 loads the photopolymer composite resin from the blender into a mixing tank of a 3D printing system (block 510).

In some instances, the mixing tank is not available and the method 500 loads the photopolymer composite resin from the blender into a second drum for storage (block 512). The photopolymer composite resin stored in the second drum may be mixed with a mixer after a time interval ranging between about 3 hours to 7 days±0.2 hours before it is transferred from the second drum into a mixing tank of a 3D printing system.

Figure 6:
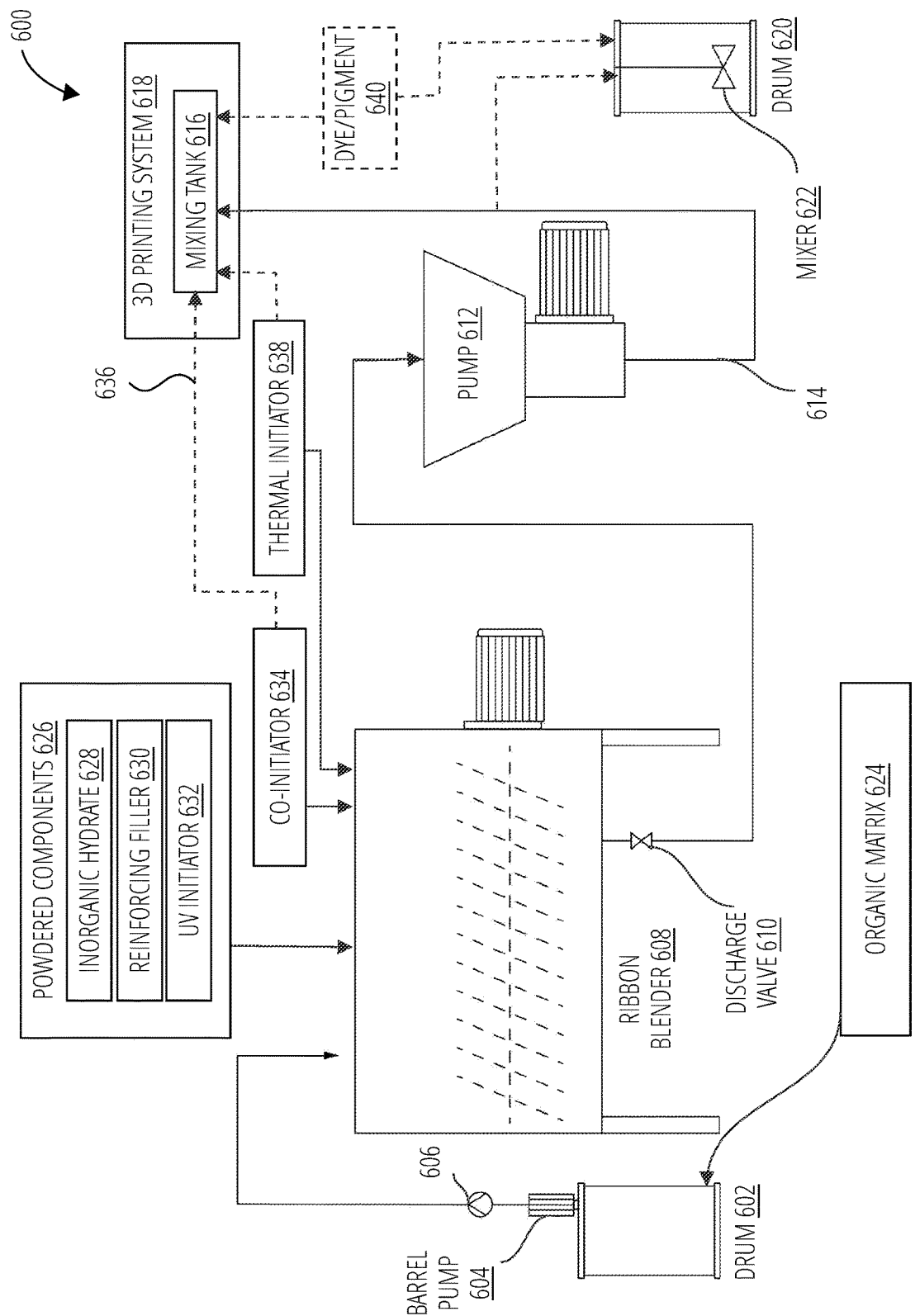
FIG. 6 illustrates a system 600 in accordance with one embodiment.

FIG. 6 illustrates an embodiment of a system 600 for generating the photopolymer composite resin for use in a 3D printing system. The system 600 comprises a drum 602, a barrel pump 604, a flow meter 606, a ribbon blender 608, a discharge valve 610, a pump 612, a hose 614, and a mixing tank 616 of a 3D printing system 618.

A drum 602 comprising the organic matrix 624 may be moved to the location of the barrel pump 604. The organic matrix 624 may comprise at least one of an acrylate monomer and an acrylate oligomer. The lid of the drum 602 may be cleaned to remove any dust. A special tool may be placed on the lid of the drum to remove the barrel cap (the larger of the two on the drum's lid). The level of organic matrix 624 inside the drum may be measured and at between about 1-3" from the top. A barrel pump 604 may be installed into the cap hole of the barrel in a vertical position. The barrel pump 604 may be placed in fluid communication with an empty ribbon blender 608. The blender's discharge valve 610 may be in the "closed" position. The barrel pump 604 may be activated, and the flow rate of the organic matrix 624 into the ribbon blender 608 may be monitored through a flow meter 606. The barrel pump 604 may be turned off as soon as the required volume of the organic matrix 624 has been transferred to the ribbon blender 608, such that the organic matrix 624 may be found ranging between about 10.0 to 30.0 w % of the formulation. If the drum 602 is emptied during the pumping procedure, the barrel pump 604 may be turned off and reinstalled onto the next drum to continue pumping.

After the organic matrix 624 is added to the ribbon blender 608, the powdered components 626 may be added into the ribbon blender. The powdered components 626 may comprise the UV initiator 632, the inorganic hydrate 628, and the reinforcing filler 630.

The UV initiator 632 may be added to the organic matrix 624 within the ribbon blender 608 ranging between about 0.001 to 0.2 w % of the formulation. The empty container of the UV initiator 632 may be weighed to ensure that the desired amount of UV initiator 632 has been added to the ribbon blender 608. If some amount of UV initiator 632 has not been loaded into the ribbon blender 608, the loading procedure may be repeated. After the UV initiator 632 has been added, the container may be closed to protect the powder from sunlight and moisture.

The co-initiator 634 may be added to the organic matrix 624 within the ribbon blender 608 ranging between about 0.001 to 0.05 w % of the formulation. The empty container of the co-initiator 634 may be weighed to ensure that the desired amount of co-initiator 634 has been added to the ribbon blender 608. If some amount of co-initiator 634 has not been loaded into the ribbon blender 608, the loading procedure may be repeated. In some configurations, the co-initiator may be added into a formulation in advance. In some configurations, the co-initiator may be dissolved in a suitable organic solvent 636 separately from the composition mixture and may be added into a formulation right before extrusion by the 3D printing system 618.

In some formulations, an acrylic prepolymer may be generated by short-term irradiation of acrylic monomers/oligomers combined with limited amount of photoinitiator. This action may increase viscosity of the acrylic monomers/oligomers to prevent filler particles from sedimentation and may allow the reactivity of the resulting mixture to be adjusted.

The reinforcing filler 630 may be added after the UV initiator 632. In some instances, the reinforcing filler 630 may come in 55 lb bags. To ensure that the correct amount of the reinforcing filler 630 is added, the bag of the reinforcing filler 630 may be placed on a floor scale and weighted to obtain the total mass of the load. A safety grating may be installed within the ribbon blender 608, and the bag of the reinforcing filler 630 may be opened and loaded into the ribbon blender 608 through the safety grating. When the bag is emptied after loading, the empty bag may be weighed. The mass of reinforcing filler 630 inside the ribbon blender 608 may be calculated by subtracting the weight of the emptied bag from the total mass weight taken initially. Additional reinforcing filler 630 may be added to the ribbon blender 608 to meet the quantity range of about 50.0 to 80.0 w % of the formulation. The ribbon blender 608 may then be turned on for about 10 minutes to form a premix resin from the components before adding the inorganic hydrate 628.

The inorganic hydrate 628 may be added after the reinforcing filler 630. In some instances, the inorganic hydrate 628 may come in 55 lb bags. To ensure that the correct amount of the inorganic hydrate 628 is added, the bag of the inorganic hydrate 628 may be placed on a floor scale and weighted to obtain the total mass of the load. A safety grating may be installed within the ribbon blender 608, and the bag of the inorganic hydrate 628 may be opened and loaded into the ribbon blender 608 through the safety grating. When the bag is emptied after loading, the empty bag may be weighed. The mass of inorganic hydrate 628 inside the ribbon blender 608 may be calculated by subtracting the weight of the emptied bag from the total mass weight taken initially. Additional inorganic hydrate 628 may added to the ribbon blender 608 to meet the quantity range of about 5.0 to 30.0 w % of the formulation. The ribbon blender 608 may then be run for 12 hours in order to mix the components.

In some formulations, the resin premix may be generated by blending the organic matrix 624, the UV initiator 632, the thermal co-initiator 634, and the fillers through operation of the ribbon blender 608 for a first amount of time ranging between 5 minutes and 20 minutes, followed by blending with the thermal initiator 638 in liquid form for a second amount of time ranging between 5 seconds and 60 seconds. The thermal initiator 638 may be at least partially dissolved in acrylate monomer to form the liquid thermal initiator.

In some formulations, the resin premix may be generated by blending the organic matrix 624, the UV initiator 632, the thermal co-initiator 634, and the fillers through operation of the ribbon blender 608 for a first amount of time ranging between about 5 and 20 minutes, followed by blending with the thermal initiator 638 in powder form for a second amount of time ranging between 30 seconds and 5 minutes. The thermal initiator 638 may be added such that it may be found in the quantity range of about 0.001 to 0.05 w % of the formulation.

The pump 612 may be positioned underneath a discharge valve 610 of the ribbon blender 608. In an embodiment, the pump 612 may be connected to the mixing tank 616 of a large gantry 3D printing system 618 through the use of a hose 614. Any appropriate 3D printing system may be used, and the disclosure is not limited to the large gantry 3D system. The gantry system (GS) mixing tank 616 may be inspected to ensure that it is operational and ready to receive the mixed components as a resin. The pump may be turned on before the discharge valve 610 is moved into the "open" position. The GS mixing tank 616 may be inspected to ensure that the photopolymer composite resin is being collected. When the flow rate of resin from the ribbon blender 608 starts to decrease, the ribbon blender 608 may be turned on to push the remnants of the resin into the pump's hopper. The pumping procedure may end when the ribbon blender 608 is emptied, at which point the ribbon blender 608 and the pump may be turned off.

In some embodients, the resin premix generated by blending the organic matrix 624, the UV initiator 632, the thermal co-initiator 634, and the fillers through operation of the ribbon blender 608 for a first amount of time ranging between about 5 and 20 minutes may be blended with the thermal initiator 638 for a second amount of time directly in the extruder of the 3D printing system 618, before the resin premix is deposited and cured.

In some instances, the GS mixing tank 616 may be unavailable to receive the photopolymer composite resin, and the resin may be loaded into a storage drum 620. The hose 614 from the pump 612 may be positioned and secured within the storage drum 620 instead of the GS mixing tank 616. The pump may be turned on before the discharge valve 610 is moved into the "open" position. When the flow rate of resin from the ribbon blender 608 starts to decrease, the ribbon blender 608 may be turned on to push the remnants of the resin into the pump's hopper. The photopolymer composite resin from the ribbon blender 608 may be pumped into one or more drums, based on the total volume of the resin within the ribbon blender 608. If a pump 612 cannot be used, an empty drum may be placed beneath the discharge valve 610, and the discharge valve 610 may be opened to pour the photopolymer composite resin into the drum. The discharge valve 610 may be closed as soon as the drum is full.

In some embodiments, the resin premix generated by blending the organic matrix 624, the UV initiator 632, the thermal co-initiator 634, and the fillers through operation of the blender for a first amount of time ranging between about 5 and 20 minutes may be stored for a period of time up to 12 months before being blended with the thermal initiator 638 for a second amount of time.

Before printing with the photopolymer composite resin stored in a storage drum 620, the resin may require mixing. A mixer 622 such as a manual mixer may be utilized to mix the resin before transferring the resin to a GS mixing tank 616. The lid of the storage drum 620 may be opened and the paddle of the mixer 622 may be positioned into the drum between the center of the drum and the inner wall. The upper layer of the resin may be mixed by moving the paddle clockwise with the mixer on until the upper layer of the drum becomes homogenous. The paddle may then be pushed to the bottom of the drum. The bottom layer may then be mixed by moving the paddle outward from the center, then up toward the upper layer of the resin near the inner wall of drum, then pushed back down toward the bottom of the drum while being moved in a counter clockwise rotation around the center of the drum. Mixing may continue until the resin is homogenous.

To prevent the contamination of the inner surface of the ribbon blender 608 with dye/pigment 640, which may influence the production of uncolored resin, the coloring procedure may be carried out on photopolymer composite resin in storage drums, which may then be labeled in accordance with the color of the dye/pigment 640 used. The necessary amount of dye/pigment 640 may be weighed out and placed into a layer of resin within the drum. A manual mixer may be utilized to mix the dye/pigment 640 with the photopolymer composite resin. After the dye/pigment 640 has been added, the resin in the drum may be mixed again after about 24 hours of storage before it is ready to be transferred to the GS mixing tank for use in 3D printing.

After about 12 hours of continuous mixing, the photopolymer composite resin may be considered to be ready for use. The photopolymer composite resin may require handling while in storage. As resin is pumped into the GS mixing tank, it may be mixed continuously until it is all consumed. Up to about 3 hours without mixing may be acceptable. In cases where the resin is kept in drums for long-term storage, the following criteria may need to be met:

Keep drums sealed at all times

Avoid exposing resin to light and moisture

Keep foreign impurities out of drums

Manually mix resin once every seven days

Do not attempt to print with resin that has gone unmixed for more than three hours In some instances, the resin may undergo a quality assurance process. After the resin has been mixed for about 12 continuous hours, a 500 mL batch may be taken for testing. Three samples may be obtained while pumping a batch out from the ribbon blender. All samples may be taken from the hose end to the GS mixing tank or the second drum.

A first sample of about 150 to 200 mL may be taken 10 to 15 seconds after pumping begins. A second sample of about 150 to 200 mL may be taken in the middle of the pumping procedure. A third sample of about 150 to 200 mL may be taken 10 to 15 seconds before pumping stops.

For resin in drum storage, the sampling procedure may be as follows:

A first sample of about 150 to 200 mL may be taken from the first drum

A second sample of about 150 to 200 mL may be taken from the second drum

A third sample of about 150 to 200 mL may be taken from the third drum

Storage in this embodiment may use three different drums, since a single load of the mixer may be equal to three drums in volume. About 100 mL from each sample may be put into a glass or PE container, mixed well, and sealed for quality assurance procedures.

Figure 7:
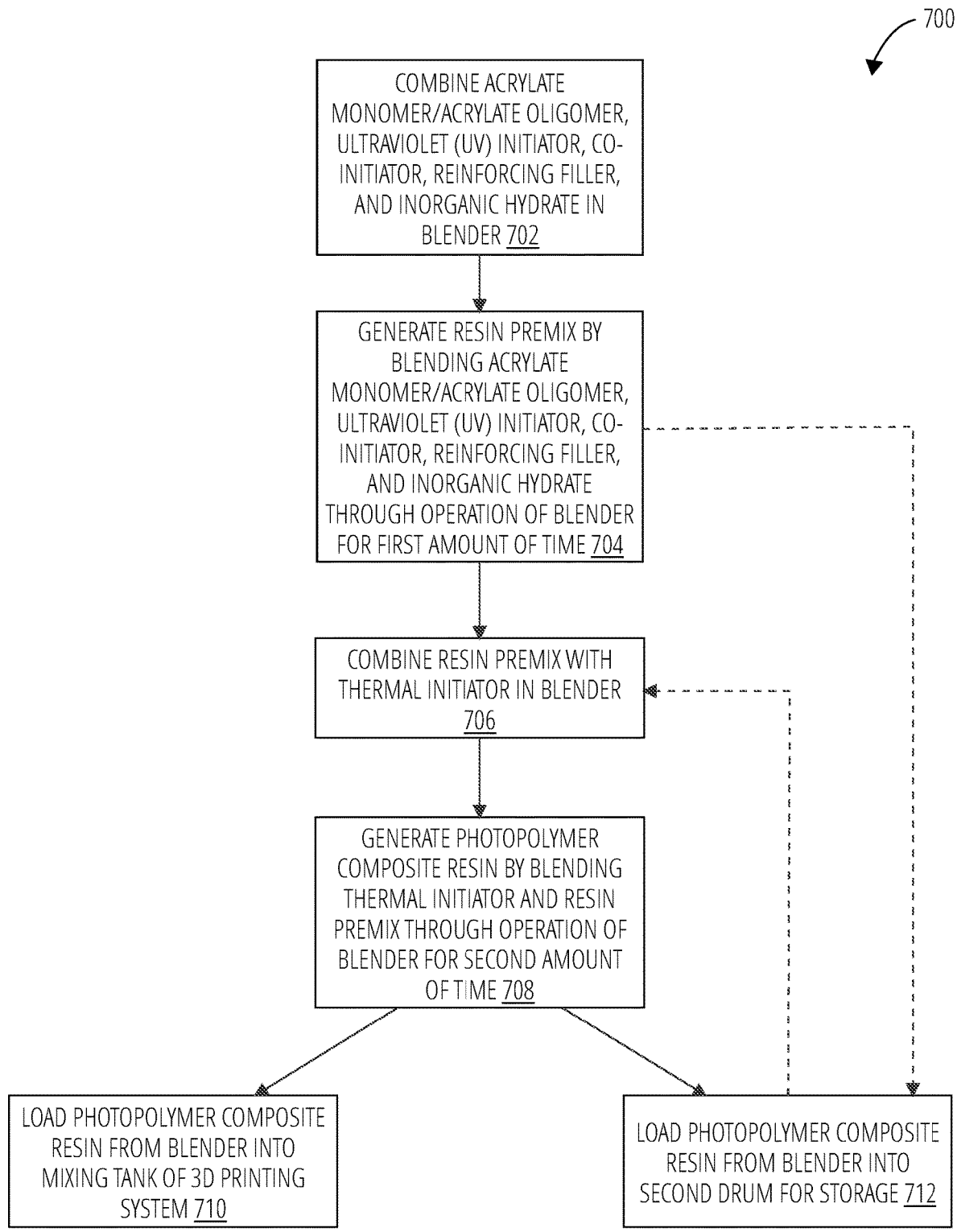
FIG. 7 illustrates a method 700 in accordance with one embodiment.

Referencing FIG. 7, a method 700 of generating a formulation of a photopolymer composite material for use in a 3D printing system involves combining at least one of an acrylate monomer and acrylate oligomer ranging between about 10.0 to 30.0 w % of the formulation in a blender, along with an ultraviolet (UV) initiator ranging between about 0.001 to 0.2 w % of the formulation, a co-initiator ranging between about 0.001 to 0.05 w % of the formulation, a reinforcing filler ranging between about 50.0 to 80.0 w % of the formulation, and an inorganic hydrate ranging between about 5.0 to 30.0 w % of the formulation (block 702). In block 704, the method 700 generates a resin premix by blending the acrylate monomer/acrylate oligomer, the UV initiator, the co-initiator, the reinforcing filler, and the inorganic hydrate through operation of the blender for a first amount of time ranging between about 5 and 20 minutes±0.5 minutes.

In block 706, the method 700 combines the resin premix with a thermal initiator ranging between about 0.001 to 0.05 w % of the formulation in the blender. In block 708, the method 700 generates a photopolymer composite resin by blending the thermal initiator and the resin premix through operation of the blender for a second amount of time ranging between about 5 seconds and 5 minutes.

In some configurations, the method 700 loads the photopolymer composite resin from the blender into a mixing tank of a 3D printing system (block 710). In some instances, in an operation after block 704 and before loading the thermal initiator, the mixing tank may not be available and the method 700 loads the photopolymer composite resin from the blender into a second drum for storage (block 712). In this scenario, block 712 returns to block 706 for the addition of the thermal initiator. In some embodiments, this method may be performed because the combination of the resin premix and the thermal initiator cannot be stored together for longer than about 1 hour. In other embodiments, the photopolymer composite resin without the thermal initiator, stored in the second drum, may be mixed with a mixer after a time interval ranging between about 3 hours to 7 days±0.2 hours before it is transferred from the second drum into a mixing tank of a 3D printing system.

Figure 8:
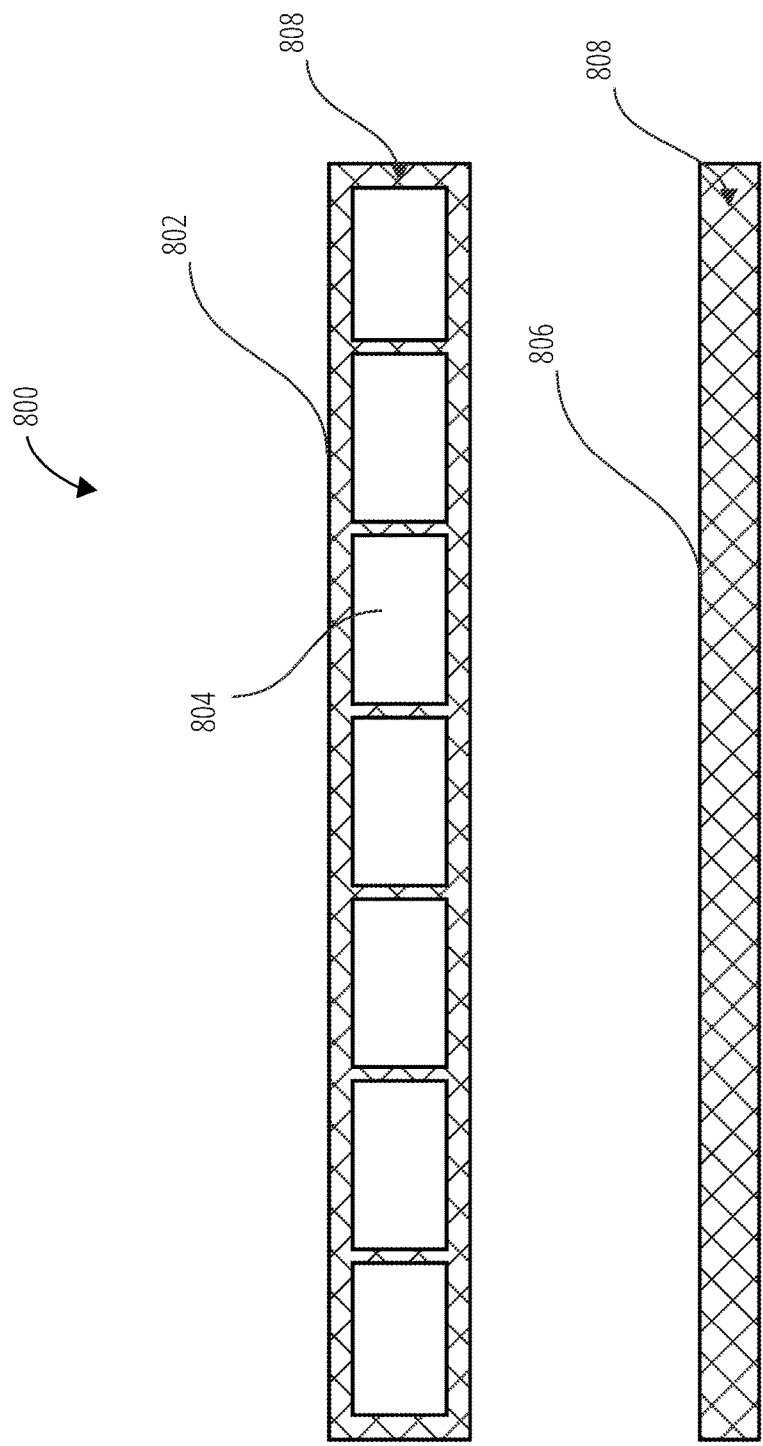
FIG. 8 illustrates cellular structure concepts 800 in accordance with one embodiment.

FIG. 8 illustrates cellular structure concepts 800 comprising a structural wall 802, hollowed out portions 804, and an in-fill pattern 808, while the structural wall 806 comprises just the in-fill pattern 808. A wall structure with a special infill pattern may be utilized to increase material load bearing capacity without using additional reinforcement. The structural layers are printed using a cellular structure for better tensile strength and integrity. The 3D printing method allows the building of structural elements with different geometries which are much better able to sustain loads compared to many materials commonly used in construction today.

Using a structural photopolymer-based composite in a solid state (without reinforcement threads or cell structure), internal testing indicates that the material is stronger than B25 and other commonly used concretes. This allows the building of solid structures with much greater material efficiency and supporting a much wider range of design possibilities than traditional methods (so called free-form architecture).

The use of a cellular structure may be able to reinforce the inherent strength of the photopolymer composite. Using the dimensional structure of a slab (ceiling board), the moment of inertia around the bending axis was raised by a factor of 10 compared to a solid section of the same area. Thus, the deformation of the slab was reduced by the same 10×.

The polymer has both greater compressive strength and elasticity than either concrete or brickwork. This may allow for the construction of buildings that are lighter and less prone to collapse: more compressive strength provides walls and floors with a high load-bearing capacity at a lower overall weight, while elasticity helps a structure to withstand deformations caused by overloads or unexpected environmental impacts (such as earthquakes). The lightweight construction reduces the load on the foundation, which reduces construction costs.

TABLE 12

Properties of 3D Printed Photopolymer Composite Material

| Mechanical Properties | Value |
| --- | --- |
| Ultimate compressive strength | 66 ± 3 MPa |
| Compressive modulus of elasticity | 5600 ± 200 MPa |
| Relative compressive deformation | 3.8 ± 0.5% |
| Ultimate tensile strength | 7.6 ± 0.9 MPa |
| Tensile modulus of elasticity | 4400 ± 400 MPa |
| Relative tensile deformation | 0.18 ± 0.03% |
| Ultimate flexural strength | 15 ± 1 MPa |
| Flexural modulus of elasticity | 9200 ± 250 MPa |
| Relative flexural deformation | 0.19 ± 0.01% |
| Thermal properties | |
| Thermal conductivity | 0.42 ± 0.03 W/m · K |
| Thermal capacity | 1430 ± 225.0 J/kg · K |
| Fire safety | |
| Flame spread index | 0-25 |
| Smoke development index | 275 |
| Environmental impact | |
| Moisture test | Pass |
| Salt fog test | Pass |
| Thermal cycling from −60° C. to 60° C. | Pass |
| Sun radiation test | Pass |
| Fungal stability | Pass |

The printed photopolymer composite material is an object which consists of many flat, horizontal layers, with layer height ranging from about 3 to 10 mm. The total structure of printed objects has some anisotropy of mechanical properties, due to the layer-by-layer deposition. Some properties of the photopolymer composite material may be shown in Table 12.

To achieve a fire protection rating (FSR) below 25, the following additives are included in the formulation: sodium tetraborate, boric acid, and aluminum oxide trihydrate. These are inorganic additives of intumescent action (i.e., they swell when heated). When the photopolymer composite material burns, it produces water vapor and a protective crust of refractory alumina. Simply speaking, the polymer is self-extinguishing. Layers of different thicknesses may allow the formulations to achieve the target properties of FSR<25 under the NFPA (National Fire Protection Association) 255 Standard and allow the material to exhibit non-combustible/self-extinguishing properties.

The photopolymer composite material underwent open-fire tests comparing the performance of a wall with modern Structural Insulated Panels (SIPs) comprising gypsum board, oriented strand board (OSB), and insulation foam.

The photopolymer composite material was tested with a width of 12 mm against gypsum board of the same width to confirm its superior fire-resistant properties as a stand-alone material. After 20 and 60 minute open-fire tests, board made from the photopolymer composite material received much less damage than the gypsum board. As a result, the wall panel with the photopolymer composite material demonstrated much better performance across a number of parameters. The designed fire-resistant properties greatly outperform those of gypsum-carton board, the most commonly used thermal barrier material in the United States.

Additionally, the formed resin may provide weather protection without cavities or seams (which are inevitable with any modular construction). This may be due to the unique printing method, as well as the hydrophobic nature of the material. Due to the nature of the photopolymer composite, the system may be able to create waterproof walls across the exterior of a structure. Apart from moisture, the exterior barrier of the structure may be also able to protect the internal wall structure from wind, dust, and other external influences, such as UV light. Another important climatic characteristic is thermal resistance (the inverse of thermal conductivity), expressed as the R-value.

Table 13 shows an example embodiment of the formulation for the photopolymer composite material for use in a 3D printing system.

TABLE 13

Example Formulation of Photopolymer Composite for 3D Printing

| Components | Quantity Ranges |
| --- | --- |
| Organic Matrix (TEGDMA) | 23 to 27 w % |
| Inorganic Hydrate (Borax Decahydrate) | 22 to 25 w % |
| Reinforcing Filler (Al(OH)$_3$) | 52 to 55 w % |
| UV Initiator (BAPO) | 0.001 w % |

Table 14 shows some mechanical properties of the 3D printed photopolymer composite material.

TABLE 14

Properties of 3D Printed Photopolymer Composite Material

| Mechanical Properties | Value |
| --- | --- |
| Ultimate compressive strength | 66 ± 3 MPa |
| Compressive modulus of elasticity | 5600 ± 200 MPa |
| Relative compressive & Imitation | 3.8 ± 0.5% |
| Ultimate tensile strength | 7.6 ± 0.9 MPa |
| Tensile modulus of elasticity | 4400 ± 400 MPa |
| Relative tensile defonnation | 0.18 ± 0.03 % |
| Ultimate flexural strength | 15 ± 1 MPa |
| Flexural modulus of elasticity | 9700 ± 250 MPa |
| Relative flextual deformation | 0.19 ± 0.01 % |

Table 15 shows the components and quantity of Test Formulation #1. Test Formulation #1 differs from the formulation in Table 13 in that the reinforcing filler is quartz powder.

TABLE 15

Test Formlation #1

| Components | Quantity Ranges |
| --- | --- |
| Organic Matrix (TEGDMA) | 23 w % |
| Inorganic Hydrate (Borax Decahydrate) | 26 w % |
| Reinforcing Filler (Quartz powder) | 51 w % |
| UV Initiator (BAPO) | 0.001 w % |

Table 16 shows some mechanical properties of Test Formulation #1.

TABLE 16

Properties of Test Formulation #1

| Mehanical Properties | Value |
| --- | --- |
| Ultimate compressive strength | 56 ± 8 MPa |
| Compressive modulus of elasticity | 2500 ± 400 MPa |
| Relative compressive deforination | 3.0 ± 0.5 % |
| Ultimate tensile strength | 8.0 ± 1.0 MPa |
| Tensile modulus of elasticity | 260 ± 40 MPa |
| Relative tensile deformation | 3 ± 0.5% |
| Ultimate flexural strength | 18 ± 3 MPa |
| Flexural modulus of elasticity | 7900 ± 1200 MPa |
| Relative flexural deformation | 0.26 ± 0.06 % |

When the mechanical properties of Test Formulation #1 and the example formulation are compared, the example formulation has a higher ultimate compressive strength, two-fold higher compressive modulus of elasticity, and a slightly higher compressive deformation. Compared to the example formulation, Test Formulation #1 has a higher ultimate tensile strength and relative tensile deformation, but significantly lower value for the tensile modulus of elasticity. The Test Formulation #1 has a higher ultimate flexural strength and a higher relative flexural deformation, but a lower flexural modulus of elasticity value compared to the example formulation.

Table 17 shows the components and quantities for Test Formulation #2. Test Formulation #2 differs from the example formulation in Table 13 by the low amount of borax decahydrate and a higher amount of the quartz powder as the reinforcing filler.

TABLE 17

Test Formulation #2

| Components | Quantity Ranges |
| --- | --- |
| Organic Matrix (TEGDMA) | 25 w % |
| Inorganic Hydrate (Borax Decahydrate) | 15 w % |
| Reinfbreing Filler (Quartz powder) | 60 w % |
| UV Initiator (BAPO) | 0.001 w % |

Table 18 shows some mechanical properties of Test Formulation #2

TABLE 18

Properties of Test Formulation #2

| Mechanical Properties | Value |
| --- | --- |
| Ultimate compressive strength | 70 ± 11 MPa |
| Compressive modulus of elasticity | 2500 ± 400 MPa |
| Relative compressive deformation | 3.6 ± 0.7 % |
| Ultimate tensile strength | 10.0 ± 2.0 MPa |
| Tensile modulus of elasticity | 280 ± 40 MPa |
| Relative tensile deformation | 3.5 ± 0.7% |
| Ultimate flexural strength | 24 ± 5 MPa |
| Flexural modulus of elasticity | 9400 ± 1400 MPa |
| Relative flexural deformation | 0.3 ± 0.06% |

When the mechanical properties of Test Formulation #2 and the example formulations are compared, Test Formulation #2 has a higher ultimate compressive strength value, but lower compressive modulus of elasticity value and relative compressive deformation values. Test Formulation #2 also has a higher ultimate tensile strength value and relative tensile deformation value, but 16-fold lower tensile modulus of elasticity value. Additionally, Test Formulation #2 has higher values for ultimate flexural strength, flexural modulus of elasticity, and relative flexural deformation.

Table 19 shows components and quantities for Test Formulation #3. Test Formulation #3 differs from the example formulation in Table 13 by completely omitting the reinforcing filler.

TABLE 19

Test Formulation #3

| Components | Quantity Ranges |
|---|---|
| Organic Matrix (TEGEDMA) | 30 w % |
| Inorganic Hydrate (Borax Decahydrate) | 70 w % |
| UV initiator (BAPO) | 0.001 w % |

Table 20 shows some mechanical properties for Test Formulation #3.

TABLE 20

Properties of Test Formulation #3

| Mechanical Properties | Value |
|---|---|
| Ultimate compressive strength | 61 ± 9 MPa |
| Compressive modulus of elasticity | 2300 ± 350 MPa |
| Relative compressive deformation | 4.4 ± 0.7% |
| Ultimate tensile strength | 5.0 ± 0.8 MPa |
| Tensile modulus of elasticity | 1280 ± 200 MPa |
| Relative tensile deformation | 0.25 ± 0.05 % |
| Ultimate flexural strength | 20 ± 5 MPa |
| Flexural modulus of elasticity | 4300 ± 650 MPa |
| Relative flexural deformation | 0.2 ± 0.06 % |

When the mechanical properties of Test Formulation #3 and the example formulation are compared, Test Formulation #3 has lower ultimate compressive strength values and 2.4-fold lower compressive modulus of elasticity values, but a slightly higher relative compressive deformation value. Test Formulation #3 also has 1.5-fold lower ultimate tensile strength values, and a 3.4 times lower tensile modulus of elasticity value, but a slightly higher relative tensile deformation value. Additionally, Test Formulation #3 has a higher ultimate flexural strength value and lower flexural modulus of elasticity value. Test Formulation #3 and the example formulation appear to have the same relative flexural deformation value.

Table 21 shows the components and quantity of Test formulation #4. Test formulation #4 differs from the formulation given in Table 13 in that the organic matrix is TMPTMA.

TABLE 21

Test Formulation #4

| Components | Quantity Ranges |
|---|---|
| Organic Matrix (TMPTMA) | 23 to 29 w % |
| Inorganic Hydrate (Borax Decahydrate) | 22 to 24 w % |
| Reinforcing Filler (Al(OH)$_3$) | 50 to 54 w % |
| UV Initiator (BAPO) | 0.07 to 0.09 w % |

Table 22 shows some mechanical properties of Test formulation #4.

TABLE 22

Test Formulation #4

| Mechanical Properties | Value |
|---|---|
| Ultimate compressive strength | 46 ± 7 MPa |
| Compressive modulus of elasticity | 2600 ± 600 MPa |
| Relative compressive deformation | 2.0 ± 0.8% |
| Ultimate tensile strength | 5.0 ± 1.5 MPa |
| Tensile modulus of elasticity | 1500 ± 700 MPa |
| Relative tensile deformation | 0.3 ± 0.05% |
| Ultimate flexural strenath | 20 ± 2 MPa |
| Flexural modulus of elasticity | 8400 ± 1400 MPa |
| Relative flexural deformation | 0.23 ± 0.06% |

When the mechanical properties of test formulation #4 and the example formulation are compared, the example formulation has a higher mechanical performance. Ultimate compressive strength of the example formulation up to 43% higher than that of test formulation #4, compressive modulus of elasticity 2-fold exceeds the value of compressive modulus of elasticity of the test formulation #4. Tensile properties of the example formulation exceed the properties of the test formulation #4 in 1.5-fold in ultimate tensile strength and in 3-fold in tensile modulus of elasticity. The Test formulation #4 has a higher ultimate flexural strength and comparable flexural modulus of elasticity with the example formulation. Test formulation #4 possesses lower stiffness in comparison with the example formulation.

Table 23 shows the components and quantity of Test formulation #5. Test formulation #5 differs from the formulation given in Table 13 in that the organic matrix comprises a mixture of TEGDMA and TMPTMA.

TABLE 23

Test Formulation #5

| Components | Quantity Ranges |
|---|---|
| Organic Matrix (TMPTMA) | 15 to 18 w % |
| Organic Matrix (TEGDMA) | 10 to 12 w % |
| Inorganic Hydrate (Borax Decallydrate) | 22 to 24 w % |
| Reinforcing Filler (Al(OH)$_3$) | 50 to 54 w % |
| UV Initiator (BAPO) | 0.07 to 0.09 w % |

Table 24 shows some mechanical properties of Test formulation #5.

TABLE 24

Properties of Test Formulation #5

| Mechanical Properties | Value |
|---|---|
| Ultimate compressive strength | 57 ± 7 MPa |
| Compressive modulus of elasticity | 3400 ± 800 MPa |
| Relative compressive deformation | 2.0 ± 0.8 % |
| Ultimate tensile strength | 8.0 ± 1.0 MPa |
| Tensile modulus of elasticity | 4500 ± 700 MPa |
| Relative tensile deformation | 0.1 ± 0.05 |
| Ultimate flexural strength | 8.0 ± 1.0 MPa |
| Flexural modulus of elasticity | 8300 ± 1400 MPa |
| Relative flexural deformation | 0.23 ± 0.06% |

When the mechanical properties of test formulation #5 and the example formulation are compared, the example formulation has a higher mechanical performance. Ultimate compressive strength of the example formulation up to 16% higher than that of test formulation #5, compressive modulus of elasticity 1.6-fold exceeds the value of compressive modulus of elasticity of the test formulation #5. Tensile properties of the example formulation commensurate with the properties of the test formulation #5. Addition of 10-12 w % of TEGDMA into the test formulation #4 improves the mechanical performance of the composite.

Table 25 shows the components and quantity of Test formulation #6. Test formulation #6 differs from the formulation given in Table 13 in that the organic matrix is PEGDMA.

TABLE 25

Test Formulation #6

| Components | Quality Ranges |
| --- | --- |
| Organic Matrix (PEGDMA) | 23 to 29 w % |
| Inorganic Hydrate (Borax Decahydrate) | 22 to 24 w % |
| Reinforcing Filler (Al(OH)$_3$) | 50 to 54 w % |
| UV Initiator (BAPO) | 0.07 to 0.09 w % |

Table 26 shows some mechanical properties of Test formulation #6.

TABLE 26

Properties of Test Formulation #6

| Mechanical Properties | Value |
| --- | --- |
| Ultimate compressive strength | 165 ± 25 MPa |
| Compressive modulus of elasticity | 1000 ± 600 MPa |
| Relative compressive deformation | 32.0 ± 5.0% |
| Ultimate tensile strength | 2.0 ± 4.0 MPa |
| Tensile modulus of elasticity | 430 ± 65 MPa |
| Relative tensile deformation | 6.0 ± 0.6% |
| Ultimate flexural strength | 50 ± 10 MPa |
| Flexural modulus of elasticity | 2400 ± 400 MPa |
| Relative flexural deformation | 2.0 ± 0.6% |

When the mechanical properties of test formulation #6 and the example formulation are compared, the test formulation #6 has 2.5-fold higher ultimate compressive strength and ultimate tensile strength than that of the example formulation. Tensile modulus of elasticity of the example formulation exceeds the property of the test formulation #6 in 4-10-fold. The test formulation #6 possesses the highest elastic properties.

The total structure of 3D printed parts may have some anisotropy of mechanical properties, because of layer-by-layer deposition. The effect of anisotropy may manifest itself in the percent difference in the properties of the printed parts along and across the deposited layers. However, a dual-curing system of initiators may reduce overall anisotropy of the printed parts. A comparative example showing the resulting products from the composition with and without the thermal initiator is shown in Table 27.

TABLE 27

Properties of 3D Printed Dual-Cured Composite in comparison with the Photopolymerized Composite

|  | Dual-cured | | Photopolymerized | |
| --- | --- | --- | --- | --- |
| Parameter | along | across | along | across |
| Ultimate compressive strength, MPa | 71 ± 4 | 70 ± 7 | 58 ± 3 | 66 ± 5 |
| Yield strength, MPa | 60 ± 4 | 52 ± 5 | 47 ± 7 | 52 ± 4 |
| Compressive modulus of elasticity, MPa | 8400 ± 800 | 5400 ± 400 | 4100 ± 780 | 4600 ± 1300 |
| Relative compressive deformation, % | 2.0 ± 0.8 | 3.0 ± 1.0 | 4.3 ± 0.6 | 5.0 ± 1.0 |
| Ultimate tensile strength, MPA | 10.5 ± 0.7 | 7.0 ± 1.6 | 10 ± 1.0 | 5.5 ± 1.2 |
| Tensile modulus of elasticity, MPa | 11000 ± 1870 | 9400 ± 1700 | 5700 ± 680 | 5900 ±1700 |
| Relative tensile deformation. % | 0.1 ± 0.02 | 0.08 ± 0.02 | 0.2 ± 0.02 | 0.1 ± 0.03 |

A Photopolymerized Composite may be generated by blending the acrylate monomers, the UV initiator, and the fillers shown in Table 28 through operation of the blender for 20 minutes. Dual-Cure Composite may be generated by blending the acrylate monomers, the UV initiator, the thermal co-initiator, and the fillers shown in Table 28 through operation of the blender for 20 minutes. The thermal initiator may be added to the premix just before the composite is extruded.

TABLE 28

Compononents of Composites for 3D Printing System

| Components | Quantity Ranges: Dual-Cure | Quantity Ranges Photopoiyintrization |
| --- | --- | --- |
| Organic Niatrix | 23 to 29 w % | 23 to 29 w % |
| Inorganic Hydrate | 22 to 24 w % | 22 to 24 w % |
| Functional Filler | 50 to 54 w % | 50 to 54 w % |
| UV Initiator | 0.07 to 0.09 w % | 0.07 to 0.09 w % |
| Thermal Initiator | 0.03 w % | 0 w % |
| Co-initiator | 0.02 w % | 0 w % |
| Dye/pigment | 0 w % | 0 w % |

Extrusion-based 3D printer equipped with a UV LED light source may be used for printing. The LED may be selected with the peak wavelength at 417 nm. The maximum light intensity of the UV LED light source on the top of the deposited layer may be 42 to 43 W/cm$^2$ with a diameter of spot size of about 20 mm. The nozzle passage speed of 40 mm/sec may be applied with the feeding rate of the composite into the nozzle (internal diameter of 10 mm) of 2×10$^3$ to 2.5×10$^3$ mm$^3$/sec, which may lead to the formation of the layer with a width of 16 mm and height of 4 mm. Photopolymerized material may be printed by applying 100% of the UV LED light source intensity. In case of dual-cure polymerization process, 3 to 6% of the maximum intensity of the light source may be used. The applied light irradiation may allow control of the initiation of the polymerization reaction at the surface. The chosen concentration of BAPO and light intensity may limit the penetration depth and allow the reaction to accumulate near the top surface of the deposited layer, thereby supporting the formation of the solid shell and avoiding deformation of the surface due to rapid solidification and volume shrinkage. As a result, the solid shell may form with the thickness of 0.5 to 1 mm, which may hold the shape of the layer.

Compared to the composite polymerized by applying the dual-curing system, the photopolymerized composite may exhibit lower mechanical performance. For the dual-cured composite, the difference of 33% may be observed for the ultimate tensile strength. The ultimate compressive strength values along and across the printed layers may be equal. The decrease in difference between the properties of the printed parts along and across the deposited layers may be caused by a reduction in anisotropy due to improved layer adhesion for the 3D printed parts. The photopolymerized composite may exhibit 14% distinction in the ultimate compressive strength values and 45% distinction in the ultimate tensile strength values. Higher stiffness of the dual-cured formulation may be due to enhancement of the conversion degree of the material within sequential photo- and thermal-polymerization curing.

The methods and formulations in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A formulation for a photopolymer composite material for a 3D printing system comprising:
   at least one of an acrylate monomer and an acrylate oligomer in the range between about 10.0-30.0 w % of the formulation;
   an inorganic hydrate, comprising a borax decahydrate, in the range between about 22.0-30.0 w % of the formulation;
   a reinforcing filler in the range between about 50.0-80.0 w % of the formulation;
   an ultraviolet (UV) initiator in the range between about 0.001-0.2 w % of the formulation;
   a thermal initiator in the range between about 0.001-0.05 w % of the formulation; and
   a co-initiator in the range between about 0.001-0.05 w % of the formulation.

2. The formulation of claim 1, further comprising a dye or pigment in the range between about 0.001-0.05 w % of the formulation.

3. The formulation of claim 1, wherein the acrylate oligomer is Triethylene glycol dimethylacrylate (TEGDMA).

4. The formulation of claim 3, wherein the TEGDMA is in the range between about 10.0-30.0 w % of the formulation.

5. The formulation of claim 1, wherein the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof.

6. The formulation of claim 1, wherein the UV initiator is bisacylphosphine oxides (BAPO)s.

7. The formulation of claim 1, wherein the thermal initiator is benzoyl peroxide.

8. The formulation of claim 1, wherein the co-initiator has a chemical formula of N,N-BIS-(2-HYDROXETHYL)-PARA-TOLUDINE.

9. A method of generating a formulation of a photopolymer composite material for use in a 3D printing system, the method comprising:
   at least one of an acrylate monomer and an acrylate oligomer in the range between about 10.0-30.0 w % of the formulation, an ultraviolet (UV) initiator, in the range between about 0.001-0.2 w % of the formulation, a co-initiator in the range between about 0.001-0.05 w % of the formulation, an inorganic hydrate, comprising a borax decahydrate, in the range between about 22.0-30.0 w % of the formulation, and a reinforcing filler, in the range between about 50.0-80.0 w % of the formulation, in a blender;
   generating a resin premix by blending the acrylate oligomer, the UV initiator, the inorganic hydrate, the co-initiator, and the reinforcing filler through operation of the blender for a first amount of time;
   combining the resin premix with a thermal initiator in the range between about 0.001-0.05 w % of the formulation in the blender; and
   generating a photopolymer composite resin by blending the thermal initiator and the resin premix through operation of the blender for a second amount of time.

10. The method of claim 9 further comprising: loading the photopolymer composite resin from the blender into a mixing tank of the 3D printing system.

11. The method of claim 10 further comprising: combining the resin premix with a dye or pigment in the range between about 0.001-0.05 w % of the formulation in the blender.

12. The method of claim 9, wherein the acrylate oligomer is Triethylene glycol dimethylacrylate (TEGDMA) and is found in the range between about 10.0-30.0 w % of the formulation.

13. The method of claim 9, wherein the acrylate oligomer is Trimethylolpropane Trimethacrylate (TMPTMA) and is found in the range between about 10.0-30.0 w % of the formulation.

14. The method of claim 9, wherein the acrylate oligomer is a mixture of Trimethylolpropane Trimethacrylate (TMPTMA) and Triethylene glycol dimethylacrylate (TEGDMA) and is found in the range between about 10.0-30.0 w % of the formulation.

15. The method of claim 9, wherein the acrylate oligomer is Poly(ethylene glycol) dimethacrylate (PEGDMA) and is found in the range between about 10.0-30.0 w % of the formulation.

16. The method of claim 9, wherein the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof.

17. The method of claim 9, wherein the UV initiator is bisacylphosphine oxides (BAPO)s.

18. The method of claim 9, wherein the first amount of time is in the range between about 5 to 20 minutes.

19. The method of claim 9, wherein the thermal initiator is at least partially dissolved in acrylate monomer to form a liquid thermal initiator, and the resin premix is combined with the liquid thermal initiator, and the second amount of time is in the range between about 5 seconds to 60 seconds.

20. The method of claim 9, wherein the thermal initiator is a powder and the second amount of time is in the range between about 30 seconds to 5 minutes.

* * * * *